United States Patent
Hinshaw

(10) Patent No.: US 7,634,477 B2
(45) Date of Patent: *Dec. 15, 2009

(54) ASYMMETRIC DATA STREAMING ARCHITECTURE HAVING AUTONOMOUS AND ASYNCHRONOUS JOB PROCESSING UNIT

(75) Inventor: Foster D. Hinshaw, Somerville, MA (US)

(73) Assignee: Netezza Corporation, Marlborough, MA (US)

( * ) Notice: Subject to any disclaimer, the term of this patent is extended or adjusted under 35 U.S.C. 154(b) by 894 days.

This patent is subject to a terminal disclaimer.

(21) Appl. No.: 10/667,128

(22) Filed: Sep. 18, 2003

(65) Prior Publication Data

US 2004/0205110 A1 Oct. 14, 2004

Related U.S. Application Data

(60) Provisional application No. 60/412,057, filed on Sep. 19, 2002, provisional application No. 60/411,686, filed on Sep. 18, 2002.

(51) Int. Cl.
*G06F 7/00* (2006.01)
*G06F 17/30* (2006.01)

(52) U.S. Cl. .................. 707/10; 707/103 X; 700/2; 709/213

(58) Field of Classification Search .............. 707/1–10, 707/100–104.1, 200–206; 709/201, 213; 700/2, 5, 48

See application file for complete search history.

(56) References Cited

U.S. PATENT DOCUMENTS

| 4,068,301 | A | 1/1978 | Ishino et al. |
| 4,594,655 | A | 6/1986 | Hao et al. |
| 4,811,214 | A | 3/1989 | Nosenchuck et al. |
| 5,687,363 | A | 11/1997 | Oulid-Aissa et al. |
| 5,701,460 | A | 12/1997 | Kaplan et al. |

(Continued)

FOREIGN PATENT DOCUMENTS

WO WO 98/55946 12/1998

OTHER PUBLICATIONS

Anurag Acharya et al., Tuning the performance of I/O-intensive parallel applications, May 1996, ACM, 15-27.*

(Continued)

*Primary Examiner*—Jean B Fleurantin
(74) *Attorney, Agent, or Firm*—Hamilton, Brook, Smith & Reynolds, P.C.

(57) ABSTRACT

In a preferred embodiment, the present invention is an asymmetric data processing system having two or more groups of processors that have attributes that are optimized for their assigned functions. A first processor group, which may be SMP machines, are responsible for interfacing with applications and/or end users to obtain queries, and for planning query execution. A second processor group consists of many streaming record-oriented processors called Job Processing Units (JPUs), typically arranged as an MPP structure. The JPUs carry out the bulk of the data processing required to implement the logic of a query, running autonomously and asynchronously from other processors in the system. The JPUs preferably use a multi-tasking operating system that permits multiple tasks to run at a given instant in time, in either an absolute-priority-based or a weighted-priority-based demand scheduling environment.

37 Claims, 9 Drawing Sheets

U.S. PATENT DOCUMENTS

| | | | |
|---|---|---|---|
| 5,721,909 | A | 2/1998 | Oulid-Aissa et al. |
| 5,781,897 | A | 7/1998 | Chen et al. |
| 5,822,527 | A | 10/1998 | Post |
| 5,835,755 | A | 11/1998 | Stellwagen, Jr. |
| 5,860,087 | A | 1/1999 | Maeda et al. |
| 5,884,299 | A | 3/1999 | Ramesh et al. |
| 5,937,401 | A | 8/1999 | Hillegas |
| 5,937,415 | A | 8/1999 | Sheffield et al. |
| 5,983,270 | A | 11/1999 | Abraham et al. |
| 5,999,937 | A | 12/1999 | Ellard |
| 6,078,955 | A * | 6/2000 | Konno et al. ............... 709/224 |
| 6,138,118 | A | 10/2000 | Koppstein et al. |
| 6,151,602 | A | 11/2000 | Hejlsberg et al. |
| 6,295,533 | B2 | 9/2001 | Cohen |
| 6,332,163 | B1 | 12/2001 | Bowman-Amuah |
| 6,339,772 | B1 | 1/2002 | Klein et al. |
| 6,345,206 | B1 | 2/2002 | Adamy et al. |
| 6,415,373 | B1 | 7/2002 | Peters et al. |
| 6,434,649 | B1 | 8/2002 | Baker et al. |
| 6,477,540 | B1 * | 11/2002 | Singh et al. ............. 707/103 R |
| 6,493,701 | B2 | 12/2002 | Ponnekanti |
| 6,493,761 | B1 | 12/2002 | Baker et al. |
| 6,507,834 | B1 | 1/2003 | Kabra et al. |
| 6,529,896 | B1 | 3/2003 | Leung et al. |
| 6,542,508 | B1 | 4/2003 | Lin |
| 6,542,886 | B1 | 4/2003 | Chaudhuri et al. |
| 6,594,651 | B2 | 7/2003 | Kabra et al. |
| 6,601,064 | B1 | 7/2003 | Nag et al. |
| 6,721,749 | B1 | 4/2004 | Najm et al. |
| 6,732,084 | B1 | 5/2004 | Kabra et al. |
| 6,789,116 | B1 | 9/2004 | Sarkissian et al. |
| 6,996,117 | B2 | 2/2006 | Lee et al. |
| 2001/0036322 | A1 | 11/2001 | Bloomfield et al. |
| 2002/0038313 | A1 | 3/2002 | Klein et al. |
| 2002/0052749 | A1 | 5/2002 | Bauer |
| 2002/0095400 | A1 | 7/2002 | Johnson et al. |
| 2002/0116358 | A1 | 8/2002 | Heath |
| 2002/0128823 | A1 | 9/2002 | Kovacevic |
| 2002/0161748 | A1 | 10/2002 | Hamel et al. |
| 2003/0009531 | A1 | 1/2003 | Richmann et al. |
| 2003/0126056 | A1 | 7/2003 | Hausman et al. |
| 2003/0212668 | A1 | 11/2003 | Hinshaw et al. |
| 2004/0117037 | A1 | 6/2004 | Hinshaw et al. |
| 2004/0133565 | A1 | 7/2004 | Hinshaw et al. |
| 2004/0148420 | A1 | 7/2004 | Hinshaw et al. |
| 2005/0021813 | A1 | 1/2005 | Kovacevic et al. |
| 2005/0154705 | A1 | 7/2005 | Zwiegincew et al. |

OTHER PUBLICATIONS

Henrique Andrade et al., Efficient execution of multiple query workloads in data analysis applications, Nov. 2001, ACM, 1-11.*

Sungdo Moon et al., Evaluation of predicated array data-flow analysis for automatic parallelization, 1999, ACM, 84-95.*

Acharya, A., et al., "Active Disks: Programming Model, Algorithms and Evaluation," ACM *Sigplan Notices, Association for Computing Machinery*, (33)11:81-91(Nov. 1998).

Keeton, K., et al., "A Case for Intelligent Disks (IDISKs)," *SIGMOD Record*, (27)3:41-52, (Sep. 1998).

Graefe, G., "Query Evaluation Techniques for Large Databases," *ACM Computing Surveys*, (25)2:73-170, (Jun. 1993).

Dewitt, D., et al., "Parallel Database Systems: The Future of High Performance Database Systems," *Communications of the Association for Computing Machinery* (3):6:85-98, (Jun. 1992).

Uysal, M., et al., "Evaluation of Active Disks for Decision Support Databases," *IEEE*, pp. 337-348, (1999).

Guyetant, S., et al., "Architecture Parallèle Reconfigurable Pour La Génoique," RENPAR'14, ASF, Sympa Conference, pp. 1-4, (Apr. 2002).

Riedel, E., et al., "Active Disks for Large-Scale Data Processing," *Computer, IEEE*, (34)6:68-74, (2001).

Hsu, W. W., et al., "Projecting the Performance of Decision Support Workloads on Systems with Smart Storage (SmartSTOR)," *IEEE*, pp. 417-425, (2000).

Dimakopoulos, V. V., et al., "The SMart Autonomous Storage (SMAS) System," *IEEE*, vol. 1, pp. 303-306, (2001).

Memik, G., et al., "Design and Evaluation of a Smart Disk Cluster for DSS Commercial Workloads," *J. of Parallel and Distributed Computing*, (61)1633-1664, (2001).

Wickremesinghe, R., et al., "Distributed Computing with Load-Managed Active Storage," Proceedings of the 11th IEEE International Symposium on High Performance Distributed Computing HPDC-11 2002) (HPDC'02), pp. 13-23, (Jul. 2002).

Leilich, H., et al., "A Search Processor for Data Base Management Systems," Proceedings of the Fourth International Conference on Very Large Data Bases, IEEE, pp. 280-287, (Sep. 1978).

Acharya, A., et al., "Tuning the Performance of I/O-Intensive Parallel Applications," *ACM*, pp. 15-27, May 1996.

Moon, S. and Hall, M. W., "Evaluation of Predicated Array Data-Flow Analysis for Automatic Parallelization," *ACM*, pp. 84-95, Aug. 1999.

Xie, B., et al., "Hierarchical Architecture for Parallel Query Processing on Networks of Workstations," *IEEE Explore*, Dec. 17-20, 1998, pp. 351-358.

Nikolopoulos, D.S., et al., "Adaptive Scheduling under Memory Pressure on Multiprogrammed SMPs," *IEEE Explore*, Apr. 15-19, 2002, pp. 11-16.

* cited by examiner

ASYMMETRIC DATA STREAMING ARCHITECTURE HAVING AUTONOMOUS AND ASYNCHRONOUS JOB PROCESSING UNIT

RELATED APPLICATIONS

This application claims the benefit of U.S. Provisional Application No. 60/412,057 entitled "Asymmetric Streaming Record Processing Computer System," filed on Sep. 19, 2002, and U.S. Provisional Application No. 60/411,686 entitled "Intelligent Storage Device Controller," filed on Sep. 18, 2002. The entire teachings of these provisional applications is hereby incorporated by reference.

This application is also related to U.S. Patent Application entitled "Intelligent Storage Device Controller," (application Ser. No. 10/667,203); U.S. Patent Application entitled "Field Oriented Pipeline Architecture for a Programmable Data Streaming Processor," (application Ser. No. 10/665,726); U.S. Patent Application entitled "Asymmetric Streaming Record Data Processor Method and Apparatus," (application Ser. No. 10/666,729); and U.S. Patent Application entitled "Programmable Streaming Data Processor For Database Appliance Having Multiple Processing Unit Groups," (application Ser. No. 10/668,113), all of which are being filed together on the same date as this application. The entire teachings of each of these co-pending patent applications is also hereby incorporated by reference. This application and the above applications are also all assigned to Netezza Corporation.

BACKGROUND OF THE INVENTION

This invention relates to distributed data processing systems that use multiple processing unit groups, and in particular to an asymmetric architecture that allows for autonomous and asynchronous operation of processing units in at least one group.

With continued development of low cost computing systems and proliferation of computer networks, the world continues to see an exponential growth in the amount and availability of information. Indeed, the Massachusetts-based Enterprise Storage Group has observed a doubling of information every few months. Demand for easy and efficient access to this ever-growing amount of digital information is another certainty. For example, World Wide Web traffic increased 300% in 2001 according to Forrester Research. Included among the applications that continue to make the greatest demands are systems for processing:

financial transactions;
  "click stream" data that encapsulates the behavior of visitors to web sites;
  data relating to the operational status of public utilities such as electric power networks, communications networks, transportation systems and the like;
  scientific data supporting drug discovery and space exploration.

Greg Papadopolous, the Chief Technical Officer of Sun Microsystems, Inc., has observed that the demand for access to decision support databases, referred to as the Input/Output (I/O) demand growth, doubles every nine months. To put this in context, Moore's Law predicts that Central Processing Unit (CPU) power doubles only about every 18 months. In other words, the demand for access to information is growing at least twice as fast the ability of a single CPU to process and deliver it.

In a typical general purpose data processing system, data is stored on one or more mass storage devices, such as hard disk drives. One or more computers are then programmed to read data from the disks and analyze it—the programs may include special database software written for this purpose. The problem with a general purpose system architecture, however, is that all the data must be retrieved from the disk and placed in a computer's memory, prior to actually being able to perform any operations on it. If any portion of the data retrieved is not actually needed, the time spent fetching it is wasted. Valuable time is thus lost in the process of retrieval and storage of unnecessary data.

The speed at which the data analysis can be performed is typically limited to the speed at which the entire set of data can be transferred into a computer's memory and then examined by the CPU(s). Usually, the aggregate data transfer rate of the disks does not govern the speed at which the analysis can be performed. Disks are inexpensive, and as such, data can be spread across a large number of disks arranged to be accessed in parallel. The effective data transfer rate of a set of disks, collectively, can therefore be almost arbitrarily fast.

The bandwidth of an interface or communications network between the disks and the CPUs is also typically less than the aggregate data transfer rate of the disks. The bottleneck is thus in the communications network or in the CPUs, but not in the disks themselves.

It has been recognized for some time that achieving adequate performance and scalability in the face of vast and rapidly growing data thus requires some kind of system architecture that employs multiple CPUs. The three most prevalent classes of so-called multiprocessing systems today include:

Symmetric Multiprocessing (SMP)
  Asymmetric Multiprocessing (ASMP)
  Massively Parallel Processing (MPP)

But even these approaches have weaknesses that limit their ability to efficiently process vast amounts of data.

SMP systems consist of several CPUs, each with their own memory cache. Resources such as memory and the I/O system are shared by and are equally accessible to each of the processors. The processors in an SMP system thus constitute a pool of computation resources on which the operating system can schedule "threads" of executing code for execution.

Two weaknesses of the SMP approach impair its performance and scalability when processing very large amounts of data. The first problem results from a limited ability to actually provide information to the processors. With this architecture, the I/O subsystem and the memory bus are shared among all processors, yet they have a limited bandwidth. Thus, when the volume of data is too high, the speed of the processors is wasted waiting for data to arrive. A second problem with the SMP approach is cache coherence. Within each processor is typically a cache memory for storing records so that they may be accessed faster. However, the more that processors are added to an SMP system, the more that time must be spent synchronizing all of the individual caches when changes are made to the database. In practice, it is rare for SMP machines to scale linearly beyond about 64 processors.

Asymmetric Multiprocessing (ASMP) systems assign specific tasks to specific processors, with a master processor controlling the system. This specialization has a number of benefits. Resources can be dedicated to specific tasks, avoiding the overhead of coordinating shared access. Scheduling is also easier in an ASMP system, where there are fewer choices about which processor to assign to a task. ASMP systems thus tend to be more scalable than SMP systems. One basic problem with asymmetry is that it can result in one processor being overloaded while others sit idle.

Massively Parallel Processing (MPP) systems consist of very large numbers of processors that are loosely coupled. Each processor has its own memory and devices and runs its own operating system. Communication between the processors of an MPP system is accomplished by sending messages over network connections. With no shared resources, MPP systems require much less synchronization than SMP and ASMP systems.

One weakness of the MPP model is that communication among processors occurs by passing messages over a network connection, which is a much slower technique than communication through shared memory. If frequent inter-processor communication is required, then the advantages of parallelism are negated by communication latency. Another problem with the MPP approach is that traditional programming models do not map cleanly onto message passing architectures. Using approaches such as Common Object Request Broker Architecture (CORBA), which are designed to handle message passing, are considered awkward by some designers.

In the late 1970s and early 1980s, several database machine architectures were proposed to move database processing closer to the data, and to offload other work from CPUs. A common theme of these machines was special hardware for performing database functions, integrated tightly with a disk. David DeWitt of the University of Wisconsin proposed a categorization scheme for these machines according to whether they had a processor per track (PPT), a processor per head (PPH), or a processor per disk (PPD).

The Content-Addressable Segment Sequential Memory (CASSM) machine was designed as a complete database engine, with a proprietary query language, and a processor per track (PPT). The CASSM processors could perform aggregation functions and had a bit-mapping scheme to process field-based searches.

The Rotating Associative Relational Store (RARES) was a selection and sorting machine, in which record data was laid out across disk tracks (rather than within disk tracks), which allowed it to examine the different fields of a record in parallel.

The DIRECT machine used a symmetric two-tier MPP system. The first tier compiled queries into packets, which could be distributed to processors in the second tier to balance the load. The processors in the second tier used a crossbar switch that allowed them to access data from any storage unit. The present invention also uses a two-tier MPP approach, but unlike the DIRECT machine, the present invention assumes an asymmetric approach, in which each back-end processor is the exclusive "owner" of its data. This avoids time spent in load balancing and in coordinating access to data among multiple processors. By tightly coupling processing with a set of data, the cost and complexity of the DIRECT crossbar switch can be avoided.

So-called Intelligent Disks ("IDISKs") are a package including disk drive, power, CPU, memory, and network interface, running a full and standard operating system. They are intended to offload computation from desktop machines. Intelligent disks are typically positioned as commodities for use in various applications, supporting file systems and directories, database, Internet, and mail. One goal of Intelligent Disks is to allow the incremental addition of capacity by plugging in new slices and choosing a personality (such as "file system" or "mail") to extend.

In the Magi system (Notre Dame), Kendall and Freeh describe a programming model in which applications apply modular stream-oriented operations to data. They discuss the use of IDISKs for intelligent caching, data compression, and database search.

Bill Bridge (Oracle) explains that, for purposes of database processing, Intelligent Disks can help allocate storage at a block level, but space within a block must be controlled by the application access method, and Intelligent Disks cannot get involved at this low level.

Like Intelligent Disks, so-called Active Disks bundle processing power, memory, and network connectivity with a disk to offer performance and functionality enhancements. Erik Reidel (CMU), a leading proponent of Active Disks, cites the following advantages of the technology:

Ability to execute application code on disks (disklets)
Parallel processing across lots of disks yields performance and scalability
Less saturation of I/O bandwidth
Scheduling ("a little bit of computation goes a long way")

Mustafa Uysal (University of Maryland) stresses the importance of a restricted execution environment for application disklets, controlled by a thin disk operating system (DiskOS), which manages scheduling, memory management, and communications. Along with Acharya (UCSB) and Saltz (UMD), Uysal notes that, while disklets can be written in any language, they should not be allowed to initiate I/O, allocate or free memory, or determine the source or destination of a stream of data. These characteristics differentiate Active Disks from Intelligent Disks. Where the former has a thin special-purpose operating system, the latter uses a general OS like Linux. Where the former allows disklets to be written in any programming language, with execution restrictions, the latter provides special stream-processing primitives, and does not impose execution restrictions.

In a performance simulation, Uysal found limited benefit to having more than 32 megabytes of memory available to the Active Disk. Instead, Uysal's simulation indicated the value of processing intermediate results as they arrive (to reduce memory usage and synchronization), and of forwarding partial results on to other processors when out of memory.

Several researchers focus on the use of Active Disks for non-database applications. For example, Lim (University of Minnesota), Kapoor (Valicert), and Wighe (Wind River Systems) use Active Disks to implement a scalable file system.

SUMMARY OF THE INVENTION

Brief Description of a Preferred Embodiment

In a preferred embodiment, the present invention is a data processing system having two or more $_{[csh2]}$groups of processors that have attributes that are optimized for their assigned functions. A first processor group consists of one or more host computers, which are responsible for interfacing with applications and/or end users to obtain queries, for planning query execution, and for, optionally, processing certain parts of queries. The hosts in the first group may be SMP type machines. A second processor group consists of many streaming record-oriented processors called Job Processing Units (JPUs), typically arranged as an MPP structure. The JPUs typically carry out the bulk of the data processing required to implement the logic of a query.

Functions of the host computers include parsing queries, generating query execution plans, optimizing parallelizing execution plans, controlling transactions, sending requests for processing to the JPUs, and receiving results of such requests. The hosts are also responsible for scheduling the execution of jobs to run locally within the host itself, or even in a third group of computers referred to as Large Job Processing Units (LJPUs).

LJPUs, which may or may not be present, preferably consist of a relatively high speed processor and relatively large amounts of memory. The LJPUs may be organized as an SMP that share portions of memory. If LJPUs are present, they can be employed to carry out suitable jobs as part of a query, such as operations that must be performed on large materialized data sets. This may include sorting, grouping, relational joining and other functions that might not otherwise be possible on a given JPU. The LJPUs may be located in the same SMP cluster as the first processor group.

However, the LJPUs also preferably play an important role in other functions, such as an Execution Engine which assist the host with coordinating the results from the many jobs that may be running autonomously and asynchronously in the JPUs.

JPUs typically include a general purpose microcomputer, local memory, one or more mass storage devices, and one or more network connections. The JPUs preferably use a multi-tasking operating system that permits multiple tasks to run at a given instant in time, in either an absolute-priority-based or a weighted-priority-based demand scheduling environment.

The JPUs are responsible for:
receiving requests from the hosts in the form of jobs, retrieving data items from disk or other data sources, and otherwise performing data processing requested as by the hosts in the first group, and other tasks such as local transaction processing, concurrency control and replication;
communicating results back to the first Execution Engine; and
occasionally communicating with other second group components.

In a preferred embodiment, each of the JPU components is dedicated to processing a predetermined subset of the a larger data set. This architectural limitation further permits each JPU to run jobs and/or portions of queries autonomously and asynchronously from jobs in process by other JPUs.

The architecture thus supports a programming model for JPUs based on jobs. A job is a portion of a larger query that can be processed to completion by either a JPU or an LJPU or a combination of the two. When processed by a JPU, a job is preferably structured so that it may run using only (a) the information already locally and authoritatively available to the JPU, and/or (b) the information directly provided to the JPU as part of the job. This allows JPUs to run autonomously and asynchronously.

A JPU may also perform other activities asynchronously and autonomously for its associated data sets such as storage allocation and deallocation; insertion, deletion and retrieval of records; committing and rolling back transactional changes; locking; logging; mirroring; replication; compression, decompression; view maintenance; and software and hardware status reporting. As a result, such functions and other administrative tasks can be carried out in a manner that is optimized for that particular JPU.

It is the case that many query execution plans require coordination such that certain jobs must be carried out in a specific sequence, which others may execute in parallel. A job dispatch component in the host may be thus used in some embodiments of the invention to enforce a requirement that certain jobs must be run in sequence. This can be implemented by issuing each job a job identifier 'tag'. A job listener component in the host then coordinates receiving job identifiers from one or more JPUs or LJPUs as jobs are completed.

The Execution Engine in the LJPU may also assist with coordinating these reports from the JPUs. This then permits results from one or more JPUs or LJPUs to be amalgamated, before results of a particular job are reported to the application.

In a preferred embodiment, each JPU also has a special purpose programmable processor, referred to herein as a Programmable Streaming Data $_{[csh3]}$ Processor (PSDP). The PSDP acts as an interface between the CPU of a JPU and storage controller and/or the mass storage device. The PSDP is a processor that is distinct from the more general purpose CPU in each JPU. It is also distinct from the CPU of the "host" in the first group.

The PSDP can be implemented as a Field Programmable Gate Array (FPGA), as in the preferred embodiment, or as an Application-Specific Integrated Circuit (ASIC), a fully-custom Application Specific Standard Product (ASSP), or even as discrete logic on a printed-circuit board. It can also be included in an integrated processor (i.e., a CPU that includes peripheral interface logic) on a single chip or in a single package, or it could be included with the circuitry of the mass storage device.

In addition to assisting the JPU in accessing data, the PSDP is a programmable device that is used to interpret data in a specific format as it is read from or written to the associated disk(s). This enables PSDP to perform portions of jobs on data directly, as it is read off the disk, prior such data being loaded into the memory of the JPU.

In an embodiment specifically adapted for processing of record-oriented data, data can be filtered by the PSDP as records and fields of a database, so that only certain fields from certain records are actually forwarded to be written into the associated JPU's main memory.

However, many other operations beyond simple filtering are possible to implement in the PSDP. For example, records with certain characteristics can be tagged as they are written in the JPU's main memory, to indicate that such records are to be ignored in further processing, or to indicate certain attributes of such records, such as if they are to be handled differently in a transactions from other records.

While the invention is of use in processing field-oriented database records, it should be understood that the system can also be used to advantage in processing many different types of data, including other field delimited data such as tables, indices, and views. The system is also advantageously used to process less structured data such as character strings, Binary Large Objects (BLOBS), XML, graphics files, and the like.

Discussion of Advantages

An important advantage of using an asynchronous, autonomous job model for execution is that JPUs can complete jobs without waiting for additional information from a host or another JPU. This increases the potential throughput of requests through a JPU, and minimizes the scheduling/coordination overhead that would otherwise be required to suspend requests in the middle of their operation until additional information was supplied.

This also enables autonomous (i.e., independent) operation of the JPUs. Specifically, each JPU may have its own multi-tasking operating system with a scheduler that determines the particular job that each JPU is dedicated to doing at a particular time based upon its local conditions. For example, if a group of JPUs are collectively assigned a sequence of jobs by the host, individual JPUs are free to complete the sequence on their own data without coordinating with other JPUs, waiting for results from other JPUs, or otherwise being constrained in the timing of their completion. This frees individual JPU to then run other jobs that may even relate to other queries, while neighboring JPU's continue to process jobs from the first query.

In certain prior art MPP architectures, parallel components operate synchronously, in lockstep. However, even if certain parallel processors finish a requested function quickly, such a system must still wait for the processor that performs the requested function most slowly to finish, before it can proceed with further work. This is not a particular problem in applications such as digital signal processing or image processing, where an identical sequence of operations is to be executed on all elements of a data set at the same time. However, in database systems, operations such as scan and restrict typically select only a portion of a data set to be subjected to further operations.

In contrast to such synchronous lock-step systems, in the present invention, a JPU processes requests asynchronously and autonomously. Each JPU is thus free to process its requests as quickly as it can, and return its results (partial or complete) to the requestor. In the interim, the JPU is available to process a different job. This asynchronous approach allows more work to flow through a system consisting of many independent JPUs.

In further aspects of the invention, the JPUs are implemented as embedded components. Thus, they are not directly accessible to applications or end users of the system. This architectural limitation has several advantages, among them:

Changes are easily made to JPU functionality because of the inherent modularity of the system, without impacting end user interfaces, or requiring changes to application code;

Bugs in application code cannot cause data corruption, crashes, or affect the requests of other applications;

An application is not required to produce new code according to a new Application Programming Interface (API), and queries written in existing standard languages using existing (APIs) will run correctly; and When a JPU responds to job requests by host components, it operates autonomously, under its own control, and is not directly controlled by any other component within the architecture.

This architecture also relieves remote or host processors from the necessity of tracking the state of multiple JPUs and making remote decisions about local affairs, which has further advantages of avoiding:

network communications that would otherwise be necessary to control the operation of the JPU;

issues of "stale" state, or the overhead of keeping state up to date; and coordination of control of the JPUs by multiple hosts, allowing increased scalability.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

A. System Level Architecture

First Group Components

The present invention is a data processing system having at least two "groups" of processing units, in which the individual components of each group are individual network "nodes" within the system. As will be explained in detail below, the present invention has to do with how the processors on the second group may operate (a) asynchronously, with respect to each other and with respect to processors in the first group and (b) autonomously, in the sense that they can complete assigned tasks without waiting for data from other processors.

Figure 1:
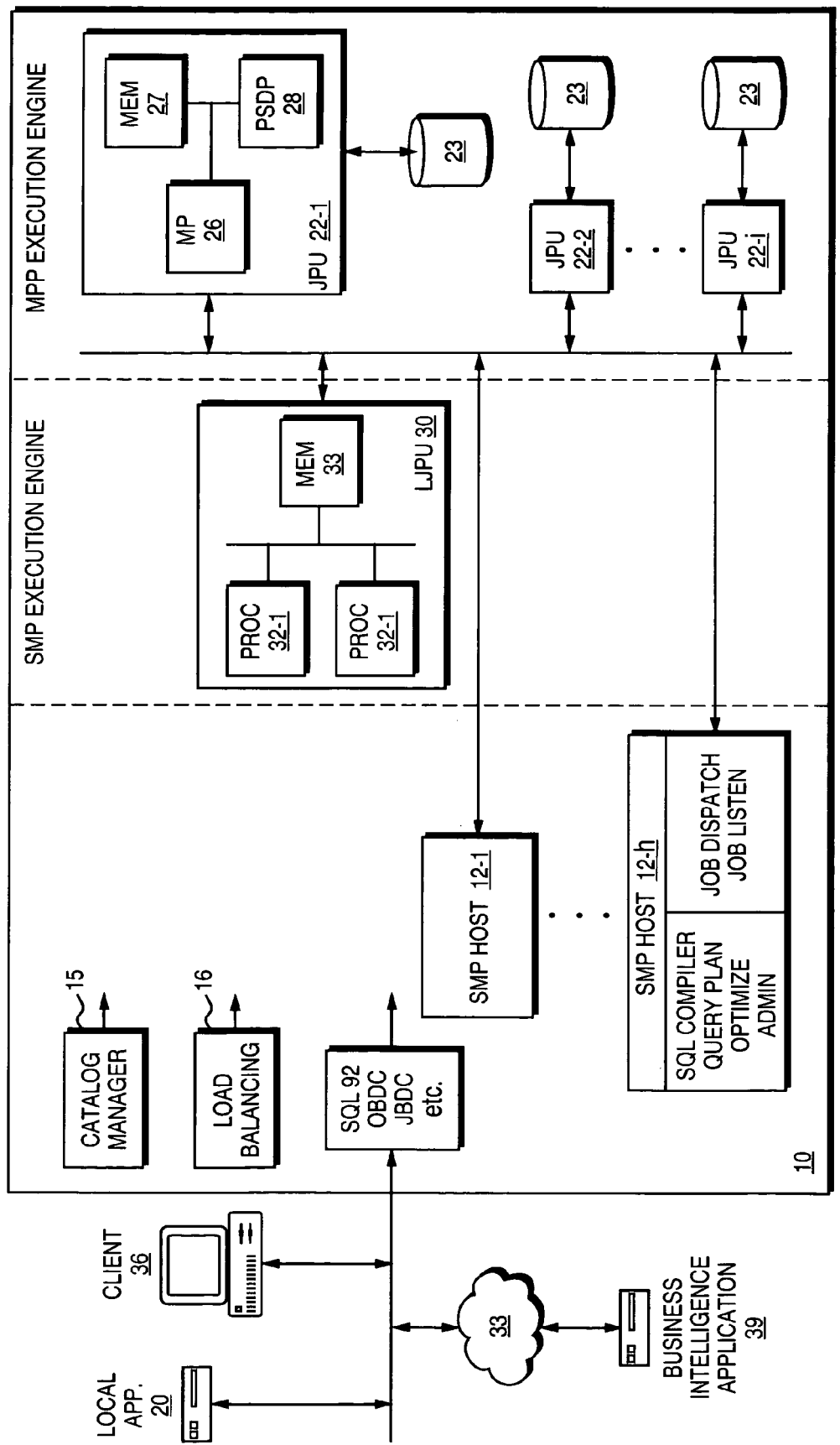
FIG. 1 is a system level block diagram of an asymmetric record processing system according to the present invention.

As more particularly shown in FIG. 1, the first group 10 consists of one or more SMP "host" computers 12-1, . . . , 12-h, each with its own memory, network interface, and local storage (not shown in FIG. 1). Each host 12 runs its own operating system, and typically, but not necessarily, each host 12 uses the same type of operating system as the other hosts 12.

The hosts 12 typically accept queries that are requests for data stored on mass storage devices, such as hard disk drives 23. The requests may originate from any number of applications, typically business intelligence applications, that may be residing on local processors 28 or client computers 36 or separately running application software 30, that may originate through a computer network 33 or locally. Queries are typically provided in a format such as Structured Query Language (SQL), Open DataBase Connectivity (ODBC), Java DataBase Connectivity (JDBC), or the like.

The hosts 12 accept queries that can retrieve, modify, create and/or delete data stored on disk 23 and the schema for such data. The hosts 12 also accept requests to start, commit, and rollback transactions against the data. The hosts 12 also perform typical administrative functions such as reporting on the status of the system 10, start and shutdown operation, backing up the current state of the data, restoring previous states of the data, replicating the data, and performing maintenance operations.

Optionally, there is a load balancing function 11 in front of the host 12 processors, which directs individual transactions to specific host or hosts 12 so as to evenly distribute workload.

A catalog management component 15 contains descriptions of the fields and layout of data. Catalog management 15 also contains information about which users and applications have which permissions to operate in which ways on which types of records, datasets, and relations. The various hosts 12 interact with catalog management 15 in order to process the requests they receive. In one embodiment, catalog management 15 is embedded within one of the hosts 12, with parts replicated to the other hosts 12 and second group 20 components. As will be understood shortly, the catalog manager is used to provide information to permit the components of the second group 20 to perform filtering functions.

With the exception of their need to consult catalog management 15, the hosts 12 are generally able to respond to requests without having to communicate among themselves. In very rare instances, inter-host 12 communication may occur to resolve a transaction sequencing issue.

Second Group Components

Figure 2:
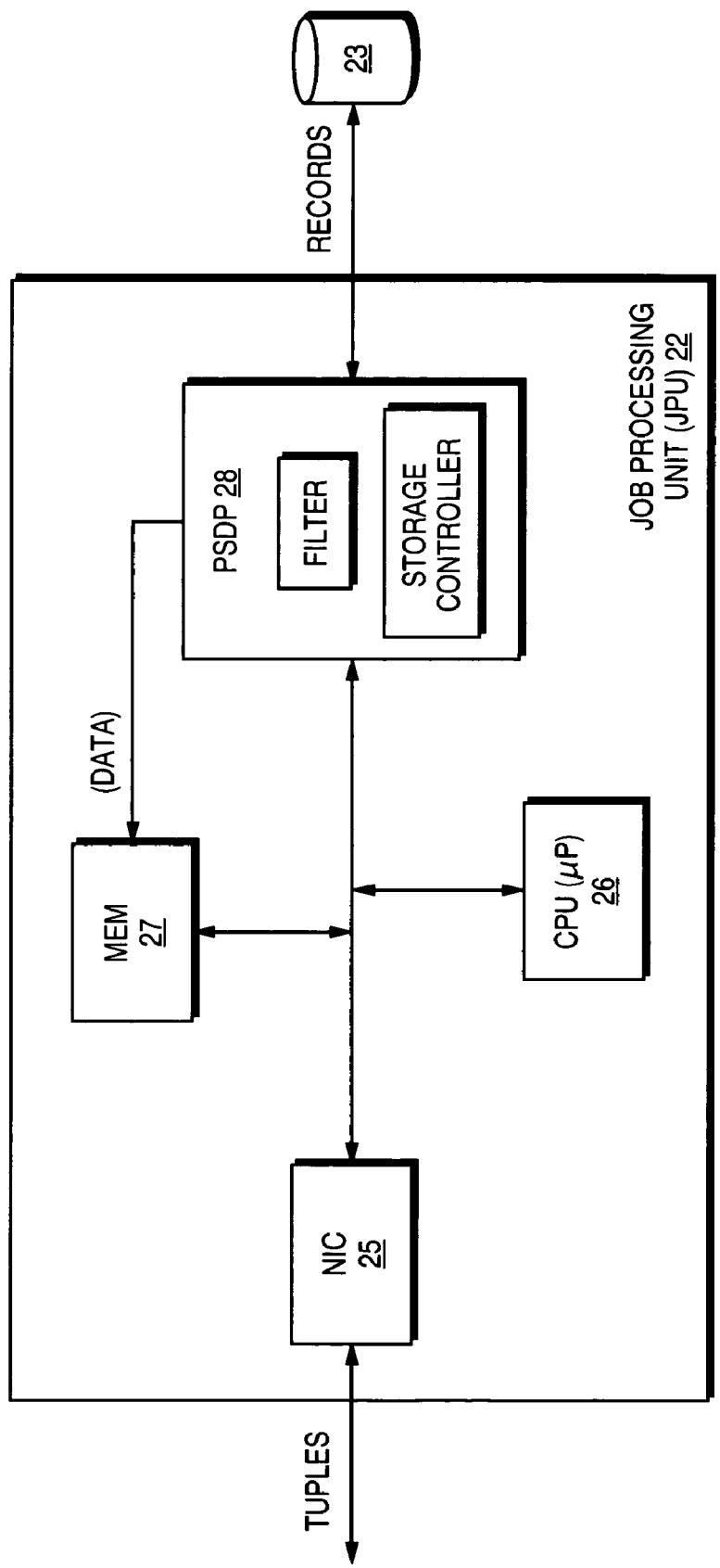
FIG. 2 is a more detailed view of a Job Processing Unit (JPU).

The second group 20 consists of a plurality of Job Processing Units (JPUs) 22-1, 22-2, . . . , 22-j. As shown in FIG. 2, each JPU 22 consists of a network interface 25 for receiving requests and delivering replies, a general purpose Central Processing Unit (CPU) 26 such as a microprocessor 26, memory 27, and a Programmable Streaming Record Processor (PSDP) 28. Each JPU 22 runs a multi-tasking schedule-based operating system. Each JPU 22 also has an attached disk 23 and disk controller from which the JPU 22 may read streaming data. In other embodiments, the JPU 22 can receive streaming record data from alternate or additional sources such as other on-board processors or via other network interfaces in place of the disk drives 23. Such streaming data might include stock quotes, satellite data, patient vital signs, and other kinds of "live-feed" information available via a network connection.

The JPU 22 accepts and responds to requests from host computers 12 in the first group 10 to process the streaming record-oriented data under its control. These requests are typically "jobs" of a larger query, and are expressed as sequences of primitive operations on an input stream. The primitive operations could be interpreted, but in the preferred embodiment, they are packaged as compiled code that is ready for execution. An exemplary job-based query is described in more detail below.

In addition to processing jobs, a JPU 22 also accepts and responds to requests from hosts for other $_{[csh4]}$operations such as:

Start, pre-commit, commit, abort, and recover transactions
Perform mirroring or other replication operations
Start, initialize, reinitialize, stop, and retrieve status information
Create, modify, or delete descriptions of records, indices, views and other metadata Each JPU 22 also accepts and responds to requests from the hosts 12 to:

Perform mirroring or other replication operations
Redistribute data from one JPU to another
Send data local to one JPU to another JPU to help process a query job
Send data to a logging device
Send data to a replication device
Acknowledge the successful completion of an operation requested by another node.

JPU(s) 22 typically use a multi-tasking Operating System (OS) to allow receiving, processing, and reporting the results from multiple jobs in a job queue. In the preferred embodiment, the OS should also support overlapping job execution. To coordinate this, the OS typically is responsible scheduling and prioritizing requests according to a number of factors that are determined in real time. These may include a job priority as assigned by the user and/or host 12, as well as a job's expected impact on the JPU's 22 local resources includes the amount of memory, disk, network, and/or I/O queues needed to complete the job. The JPU 22 can also contain software for performing concurrency control, transaction management, recovery and replication of data for which the JPU is responsible.

In the preferred embodiment, JPUs 22 in the second group 20 are not directly visible or accessible to the users of, or the applications that run on, for example, the external clients that present queries to the system 10. The JPUs are an embedded component and maintain significant autonomy and control over their data. A given record (or other data primitive) in the system 10 is thus normally directly accessible to, and processed by only one JPU 22. While JPUs may replicate their records to increase reliability or performance, they do not share responsibility for processing a given record with other JPUs 22 when carrying at a job as part of a query.

The storage manager 320 within each JPU 22 provides autonomous and asynchronous support for other functions such as error checking, creation and deletion of tables, the use and maintenance of indices and views, record insert and delete, mass loading of existing user data among various JPUs, and the like.

3. Third Group Components

The system architecture exhibits further aspects of asymmetry in that one or more so-called Large Job Processing Units (LJPUs) 30 can also play a part in processing queries. Each LJPU 22 consists of a network interface for receiving job requests and delivering replies, and one or more general purpose Central Processing Units (CPUs) 32-1, . . . , 32-p (each of which may have their own internal memory), as well as a shared memory 38. The CPUs 32 in the LJPUs 30 preferably represent a relatively powerful computing resources, consisting of a relatively high speed processor that has access to relatively large amounts of memory. The LJPUs may be organized as an SMP that share portions of memory 38. The LJPUs may be located in the same SMP cluster as the first processor group.

LJPUs are employed to carry out jobs that are not otherwise suitable or possible to perform on the JPUs, such as operations that must be performed on large materialized data sets. This may include sorting, grouping, relational joining and other functions on filtered data, that might not otherwise be possible on a given JPU.

The LJPUs also preferably play an important role in other functions. One such function is to serve as an Execution Engine which assists the hosts 12 with coordinating the results from the many jobs that may be running autonomously and asynchronously in the JPUs 22.

LJPU(s) 20 may also typically use a multi-tasking Operating System (OS) to allow receiving, processing, and reporting the results from multiple jobs in a job queue. In the preferred embodiment, the OS should also support overlapping job execution. To coordinate this, the OS typically is responsible scheduling and prioritizing requests according to a number of factors that are determined in real time.

Throughout the system, the components and sub-components are designed to optimize performance through extensive use of streaming operations coupled with tuple set operations. As will be understood shortly most operations are designed to take tuple sets (records or groups of records) as their input and output streams; these operations try not to materialize data, but instead they stream the output to the next operation. As a consequence many operations can be handled as one continuous data flow, whereas in a conventional system, it would be necessary to handle them in various layers.

For instance, a storage layer can be designed as a tuple set manager where (from the view of other JPU processes) it stores and retrieves tuple sets. From the storage layer onward, data is normally handled in tuple sets, providing a consistent, well organized, and easily accessible format for internal operations. This is in contrast to other systems where the storage layer stores and retrieves undifferentiated blocks of data which are later converted to tuple sets by some other downstream process. Another example of the streaming/tuple set architecture is the network layer, which sends and receives tuple sets instead of blocks of data.

Yet another example is a merge aggregation node, where a sorted data stream is aggregated as requested, and whenever a new key index value is received, the aggregation from the previous key index value may be streamed to the next node.

A streaming/tuple set operation can be illustrated by tracking a typical dataflow during a load operation. In this example load case, as data is read into a host 12 over TCP/IP network connection 32, that data is parsed, error-checked, and transformed, and the distribution value calculated, all while the specific byte/field is in processor cache, and saved to the internal network output frame buffers as one step.

The result is that the input data is read and transformed in a streaming fashion and converted to network-ready tuple set packets at streaming speed with minimal overhead. Specifically, as each data record is received, it is sent over the internal network 34 to an appropriate JPU 22 (as determined by the a distribution value in a Query Plan). At the JPU 22, the received data is read, converted into an approved storage format, and placed in memory buffers on a record-by-record basis. As memory buffers are filled, a storage layer in the JPU double-checks that the data corresponds to the indicated table, and that the table "owns" the physical space on the disk 23, and then writes that data to the disk 23. Note that during this process, a given byte of data was "touched" only a few times, and that the data was manipulated in tuple sets thereby optimizing performance and reliability.

A second illustration of a streaming tuple set operation is a join/aggregate operation where three joins and one co-located aggregation are performed on JPUs 22, and the results are returned through the host 12 via ODBC to the ODBC client 36 (e.g., Business Objects). In this example, on each of three JPU's, the disk 23 is scanned and data read off the disk through the associated PSDP, which filters records of interest and fields of interest within those records, and places the resulting tuples into a tuple set buffer in JPU memory. As each tuple set buffer is filled, that tuple set is passed through each of three JPU join nodes and the aggregate node in turn. Each time a new key value is received by the aggregate node, the previous aggregate value and associated key value tuple are transformed as necessary per the ODBC request, and placed in the JPU network packet output buffer associated with the requesting host 12. When a network packet output buffer in the JPU is filled, its contents are sent to the host 12, where it is immediately placed in the user-side network buffer and is immediately sent to the ODBC client 36.

Note that, as in the previous example, the data was "touched" only a few times. Because the data was handled in tuple sets, it could be operated on as integral units with very minimal overhead. Because the operations are extremely integrated, mixed operations such as joins, aggregates, output transformation, and network packet creation are all performed while the data is in processor cache memory.

B. Host Software Functions

Figure 3:
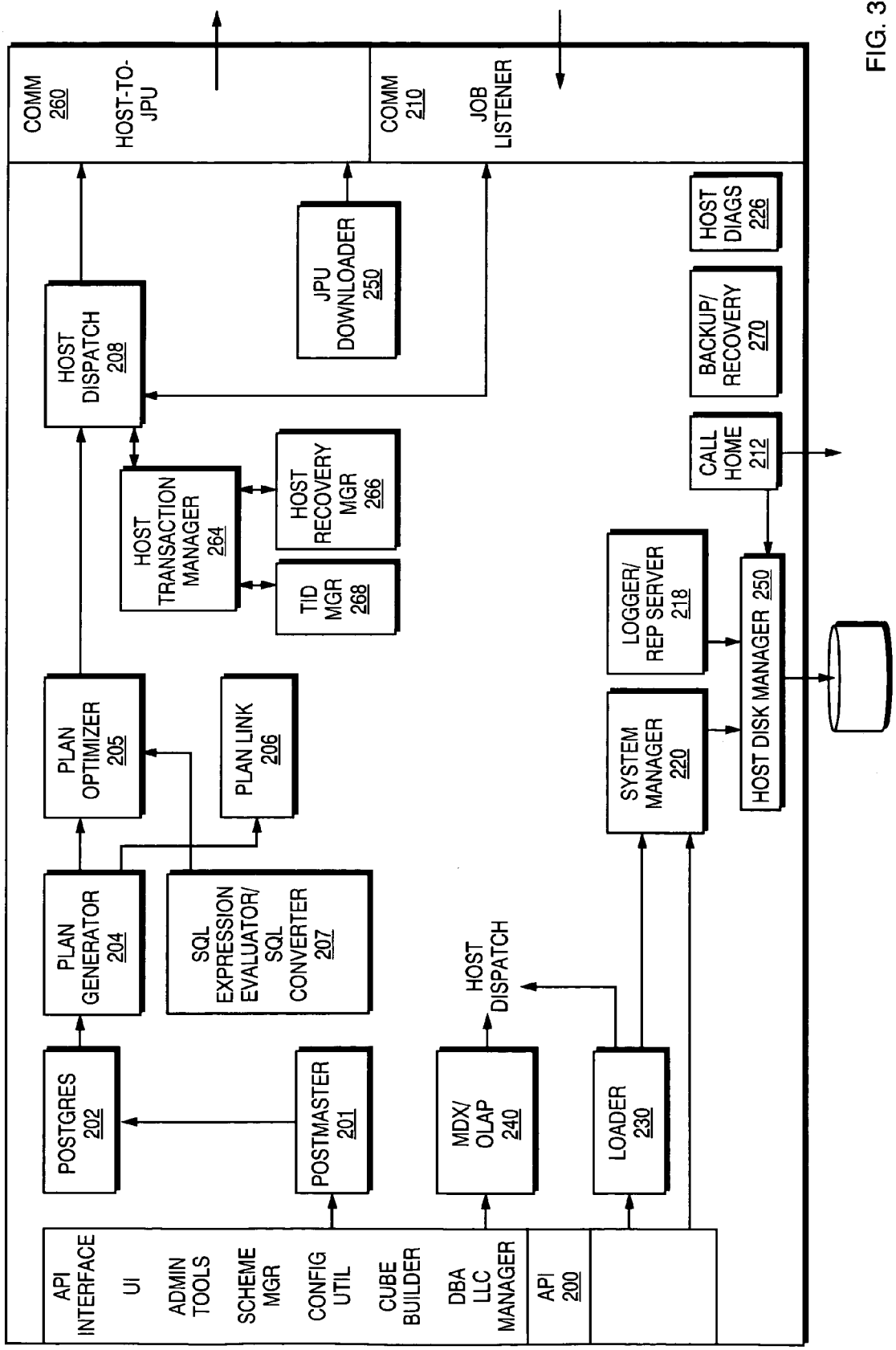
FIG. 3 is a detailed view of software components in a host.

FIG. 3 is a software component diagram for a host 12. A summary description of the functional blocks and their interactions now follows. This list is intended here to be an introduction to a more detailed description of how a query is processed into a set of jobs that can then be carried out as synchronously and autonomously by JPUs 22.

Postmaster 201/Postgres 202
    Serves as Front-end for query processing
    Postmaster 201 accepts requests from user applications via API 200
    Creates an Execution Plan
    May use authentication Plan Generator 204
    Parse/query rewrite/planner—plans how query will be processed.
    Supports SQL-92 DDL/DML
    Supports SQL Functions
    Provides compatibility with Oracle, SQL Server
    Integrated with SQL triggers, stored procedures Plan Optimizer 205
    Cost-based optimizer, with the addition of locale costs which optimizes for most efficient operation/highest level performance
    Indicates which operations will be done within host and which will be done within JPU
    Communicates with Plan Link, providing tips on what filtering should be done within the Programmable Data Streaming Processing ("PSDP") if there are multiple filters that can be done there (more than the PSDP can handle)
    Maintains usage/reference statistics for later index creation, refreshing cluster indices Plan Link 206
    Takes an Execution Plan as input
    Analyzes Execution Plan and splits plan further, identifying what will be done within the PSDP 28, what will be done within the JPU 22 after the PSDP 28 has returned its data to the JPU 22, and what will be done in the Host 12 after the JPU 22 has returned its data SQL Expression Evaluator/SQL Converter 207
    Expression Evaluator
    Creates object code for evaluating given expression to be executed on the Host, JPU, and PSDP based on the expressions, their type, and the capabilities of the installed hardware Host Dispatch 208
    Similar to standard UNIX scheduler/dispatcher
    Queues execution plan and prioritizes based on (a) the plan's priority, history, and expected resource requirements, and (b) available resources and other plans' requirements
    Controls number of jobs being sent to any one JPU 22 or LJPU 30 to avoid JPU/LJPU Scheduler or JPU/LJPU memory overload
    Sends Host jobs to host
    Sends JPUs jobs to be monitored to the Execution Engine 360 in the LJPU.

Communications Layer 210
    Provides communications among the nodes
    Includes Job Listener to await data from nodes
    Uses striping data from a Topology Manager to direct multicast and unicast messages
    Detects non-responsiveness of nodes and communicates with Topology Manager to trigger failover processing Call Home 212
    Initiates message to a Technical Assistance Center (not shown) to identify failed part and trigger service call or delivery of replacement component (as appropriate given user support level)
    Optionally communicates via SNMP to a defined app to receive a failure indicator and callhome trigger
    Logs error(s)

Logger/Replication Server 218
    Logs transaction plans, messages, failures, etc. to Netezza log in conventional fashion
    Implemented as a standard transaction logger/replication server System Manager 220
    Defines and maintains JPU/LJPU Configuration information, striping information
    Mirror Master—maintains mirrors info—what JPUs are being mirrored where, maintains SPA data, maintains info on system spares
    Initiates failover processing when informed by Comm layer of a non-communicative JPU—directs mirror of failed JPU to take over as primary and begin copying to designated spare, directs primary of JPU mirrored on failed JPU to copy its data to that same designated spare, to reduce load on mirror of original failed JPU also directs mirror of the primary on that failed JPU's mirror to do double duty and act as new primary until failover copying has been completed
    Communicates to callhome component to initiate replacement process
    Manages system expansion and allows for redistribution of data as appropriate or as requested by user during expansion
    Initiates JPU/LJPU diagnostics when appropriate
    Provides an API to allow client management interface to get configuration data for user display/control Host Diags 226
    Runs diagnostics on Host as required/requested Loader 230
    Provides fast loader capability for loading user data onto disks
    Communicates directly to Host Dispatch to load database/insert records
    Communicates with System Manager to get configuration and mirroring data
    Controls index creation on primary (and sets up job to run later to create indices on mirror)
    Supports input via a number of methods (e.g., tab-separated data, backup/recovery)
    Does ETL, converts data from Oracle, SQL Server, DB/2, etc. to the internal data format MOX/OLAP 240
    Provides OLAP/MDX, ROLAP Engine on Host
    Creates and maintains MOLAP cubes
    Supports multi-user MDX
    Creates Execution Plans for OLAP requests and communicates these directly to Host Dispatch
    Supports metadata writeback
    Provides administrative support for user creation, security
    Access System Catalog through API Cube Builder User Interface (UI) 242
    Provides interface for defining and managing cubes to be used in OLAP Processing JPU Downloader 250
    Downloads Firmware to System JPUs 22 at system initiation/boot
    Downloads PSDP 28 and JPU 22 images
    Communicates with System Manager to understand number of JPUs and JPU configurations
    Initializes spares for failover
    Initializes replacements Host Disk Manager 250
    Manages Host Disk (used for Catalog, Temp Tables, Transaction Log, Netezza Log, Swap space)

Figure 4A:
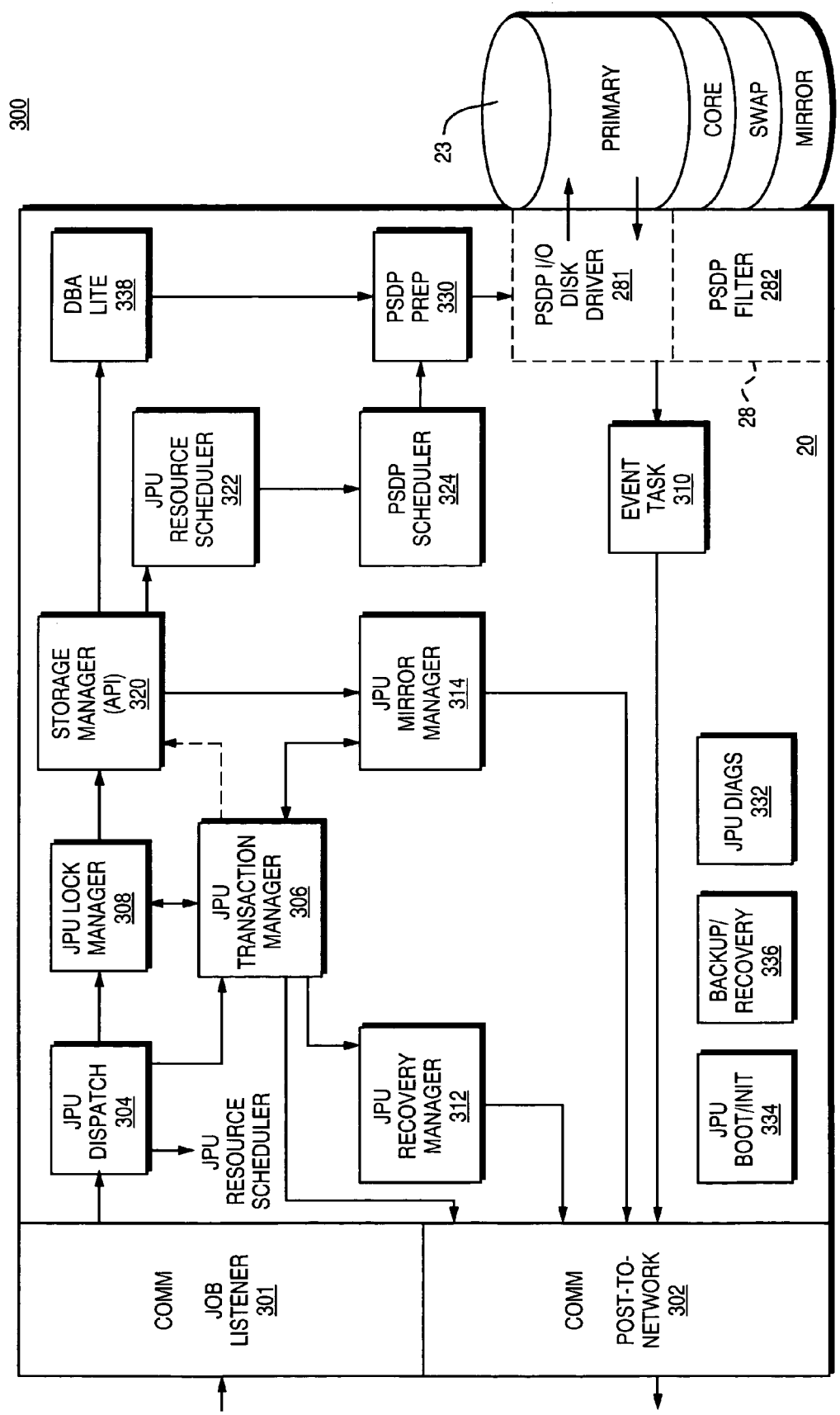
FIG. 4A is a detailed view of Job Processing Unit (JPU) software components.

Host Transaction Manager 264
    Manages transactions on the host 12
    Controls requests sent to JPUs 22 that will be involved in the transaction
    Provides lock management and deadlock detection
    Initiates abort processing
    Sends state data to Recovery Manager 266
    Sends ID requests to the Transaction I.D.(TID) Manager 268
    Provides transaction IDs and deleted transaction IDs to ensure that disk records are preceded
    Manages catalog requests as transaction requests as required TID Manager 268
    Provides unique transaction identifiers (TIDs)
    Coordinates with other hosts to avoid generating duplicate TIDs Host Recovery Manager 266
    Ensures transaction atomicity after component (e.g., JPU) failure
    Maintains journal of transaction state
    Initiates rollback as required Backup/Recovery 270
    Supports Host side of Backup/Recovery process
    Interfaces with Transaction Manager and JPU Storage Manager C. JPU Software Components
    FIG. 4A is a diagram of the software components of a JPU 22.

Communications Layer 300
    Provides internal communication among nodes
    Includes Job Listener 301 to await requests
    Includes Network Poster 302 to send data when buffer filled, job completed, or at Host request JPU Dispatch/Scheduler 304
    Receives plan through Communications Layer 300
    Queues Plan
    Schedules/dispatches jobs according to their priority, "fairness" to date, expected resource requirements, and available resources JPU Transaction Manager 306
    Processes changes in transaction state to begin a transaction, pre-commit a transaction, commit a transaction, or abort a transaction
    Handles processing of dependencies among transactions as flagged by the lock manager; broadcasts information about these dependencies to relevant host(s); initiates deadlock checks JPU Lock Manager 308
    Controls concurrent access to data
    Interfaces with EventTask 36 before a query is executed and for each result set returned from a scan
    Provides support for arithmetic locking JPU Recovery Manager 312
  Maintains a Journal to track transaction status on the JPU 22, using the Storage Manager API
  Performs transaction recovery when requested by JPU Transaction Manager JPU Mirror Manager 314
  Mirror Sender receives copies of record updates from Storage Manager 320 and transmits these to the mirror for this JPU when an updating transaction commits
  Mirror Receiver receives record updates, buffers these in memory, and flushes out to disk through the Storage Manager when the Mirror Receiver buffer is full
  Transmits all data to a spare system during failover processing Storage Manager 320
  Stores and manages information on disk in optimal fashion
  Has an API that supports storage and retrieval of tuple sets
  Supports error checking to insure that the data conforms to the indicated table and the indicated table "owns" the physical space to which the data is being written
  Supports creation and deletion of tables, views, and indices
  Handles record inserts and deletes
  Supports ETL and mass loading of existing user data
  Provides storage support for commit/rollback
  Provides support for Precise Indexes
  Provides mirroring support for failover
  Optimizes sort operations and utilizes smart hash algorithm for data distribution/striping
  Provides support for compression and smart storage optimization
  Controls disk I/O JPU Resource Scheduler 322
  Schedules jobs to run on the PSDP 28; communicates with JPU/PSDP Scheduler 324 to queue up PSDP requests to retrieve required data
  Optimizes the queue to keep the PSDP/disk as busy as possible, with requests from multiple queries intermixed in the queue based on disk characteristics and location of data on the disk
  Takes into account the needs of any data loading for new tables being created and transformed to internal data format (i.e., to optimize the loading process)
  Supports heuristic-based scheduling, ensuring that jobs are scheduled on a priority basis, but also ensuring that all jobs do get serviced (e.g., raising a job in priority if it has not been run in a certain interval of time)
  Supports synchronous/piggy-backed scans, combining similar requests to optimize PSDP processing
  Manages memory buffers/memory allocation on JPU; allocates memory to Execution Plans based on expected needs and hints received from Plan Optimizer
  JPU Paging (if required)

PSDP Prep 330
  Defines the instructions that will be given to the PSDP 28 in order to process a request (instructions tell the PSDP 28 what to do with each field being read from the disk)
  Identifies what filtering, transformation, projection, and aggregation operations are to by run by the PSDP 28

Figure 4B:
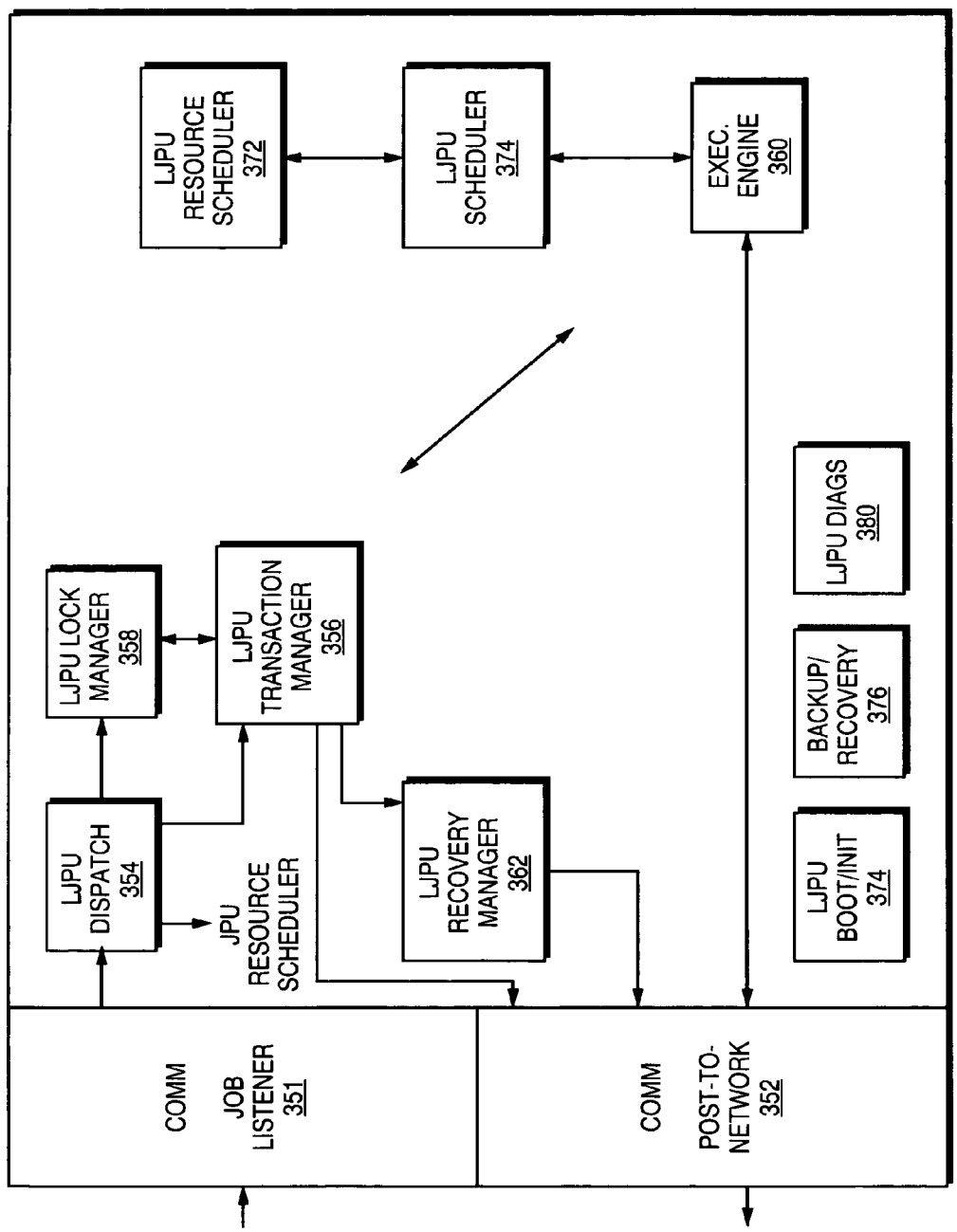
FIG. 4B is a detailed view of Large Job Processing Unit (LJPU) software components.

EventTask 310
  Executes the portion of the Execution Plan that could not be handled by the PSDP but that does not have to be handled at the Host level
  Handles sorts, joins, transformations, and aggregations that could not be done as data stream through the PSDP 28
  Maintains a memory buffer of result set records and returns these to Host through the Comm Layer when buffer filled, job completed, or at Host request JPU Diags 332
  Runs diagnostics on JPU as required/requested JPU Boot/Init 334
  Executes image burned into flash memory at boot time to bootstrap the JPU, run diagnostics, register the JPU with the primary Host server, and download new image from Host to run
  Loads and transfers control to the image downloaded from the primary Host server to load the JPU application code, the operating system, the network stack, and disk driver code Backup/Recovery 336
  Supports JPU side of Backup/Recovery process
  Interfaces with Transaction Manager and JPU Storage Manager DBA Lite 338
  Provides automatic and dynamic disk and Storage Manager support
  Supports dynamic index creation, defragging, index garbage collection, timers, agents JPU/PSDP Scheduler 324
  Schedules jobs to run on the PSDP; queues up PSDP requests to retrieve required data D. LJPU Software Components FIG. 4B is a diagram of the software components of a Large JPU (LJPU) 30; the components are in general a subset of those found in the JPUs 22. Since the LJPUs are not typically responsible for managing data on the disks 23, components such as storage manager and mirror manager are not needed. If LJPUs exist in the system, they do have a special additional Execution Engine 360 component that is not found in the JPUs 22. However, If LJPUs are not present in the system, the Execution Engine 360 component can reside in the host 12.

LJPU Communications Layer 350
  Provides internal communication among nodes
  Includes Job Listener 351 to await requests
  Includes Network Poster 352 to send data when buffer filled, job completed, or at Host request LJPU Dispatch/Scheduler 354
  Receives plan through Communications Layer 350
  Queues Plan
  Can schedules/dispatch jobs according to their priority, "fairness" to date, expected resource requirements, and available resources LJPU Transaction Manager 356
  Processes changes in transaction state to begin a transaction, pre-commit a transaction, commit a transaction, or abort a transaction
  Handles processing of dependencies among transactions as flagged by the lock manager; broadcasts information about these dependencies to relevant host(s); initiates deadlock checks LJPU Lock Manager 358
  Controls concurrent access to data
  Provides support for arithmetic locking LJPU Recovery Manager 362
  Maintains a Journal to track transaction status on the LJPU 30, using the Storage Manager API
  Performs transaction recovery when requested by LJPU Transaction Manager 356

LJPU Resource Scheduler 372
  Schedules jobs to run on the LJPU

LJPU Diags 380
  Runs diagnostics on JPU as required/requested

LJPU Boot/Init 374
  Executes image burned into flash memory at boot time to bootstrap the LJPU, run diagnostics, register the LJPU with the primary Host server, and download new image from Host to run
  Loads and transfers control to the image downloaded from the primary Host server to load the LJPU application code, the operating system, the network stack, and disk driver code LJPU Backup/Recovery 376
  Supports LJPU side of Backup/Recovery process
  Interfaces with LJPU Transaction Manager LJPU Scheduler 374
  Schedules jobs to run on the LJPU Execution Engine 360
  Receives partial record sets from JPUs 22 through the Comm Layer Job Listener
  Executes remainder of Execution Plan that has to be done at LJPU
  Provides intermediate and final sort-merge of JPU 22 results sorted data as required
  Handles joins of data returned from JPUs 22 as required
  Communicates to JPUs through Comm Layer 350 to request partial result sets from JPU buffers when idle (e.g., to get and sort/process partial records that the JPU currently has instead of waiting for JPU 22 to fill a buffer E. Details of PSDP Component 28 of the JPUS 22

As discussed above, the PSDP 28 functions as the disk drive controller and as a coprocessor or hardware accelerator for the JPU to which it is attached. During DMA disk read operations, the PSDP 28 filters the data it is reading. More specifically, it parses the disk data to identify block, record, and field boundaries. Fields can thus be transformed and compared with data from other fields or with constants, right in the PSDP 28, and prior to storing any data within the JPU memory or processing any data with the JPU CPU 26. The comparisons are combined to determine if a record is wanted, and if so, selected header and data fields are formatted and returned to SPU memory. If a record is not wanted, the PSDP ignores it and proceeds to the next. The PSDP 28 thus performs two major functions: as a disk driver logic interface 281 and tuple filter 282.

Each of these functions is described in some detail below. It is sufficient here to note that the disk driver logic interface 281 accepts standard disk drive interface signaling, such as IDE (Integrated Device Electronics) or SCSI (Small Computer Systems Interface), adapting it to a particular CPU native "bus" such as a Advanced Technology Attachment (ATA) bus or the like. Alternatively, if there is a communications network, such as Ethernet or Fibre Channel, instead of array of disks 23 to provide access to input data stream(s), the interface 281 becomes a network interface that is suitable to receive and/or transmit data over a communications network. The disk driver logic 281 is usually implemented in an Integrated Circuit (IC) in a computer or communications device, in or part of an IC that contains other logic, such as other interface logic or the CPU 26 itself. The disk driver 281 could even be inside the disk 23 itself, making the disk a special-purpose unit attachable only to JPUs or communications devices for which the interface is specific.

In the preferred embodiment, the PSDP 28 is an IC that interfaces a standard disk 23 to a peripheral bus of the JPU 22. All such controllers have the basic function of allowing the CPU 26 in the JPU 22 to read and write the disk 23, typically by setting up long data transfers between contiguous regions on the disk and contiguous regions in the CPU's 26 memory (a process usually referred to as DMA, for Direct Memory Access).

Most importantly, the PSDP 28 also provides programmable hardware directly in the disk read path, to and from the controller. This portion of the PSDP hardware, called a "filter" unit 282, can be programmed by the JPU's CPU 26 to understand the structure of the data the analysis software running on the CPU 26 wishes to read and analyze. The PSDP 28 can be this programmed to operate on data it received from the disk 23, before it is shared into the CPU's memory, in the process discarding fields and entire records that the CPU 26 would have to analyze and discard in the absence of the filter unit.

In an embodiment specifically adapted for processing of record-oriented data, data can be filtered by the PSDP 28 as records and fields of a database, so that only certain fields from certain records are actually written into the associated JPU's main memory 27. However, many other operations beyond simple filtering are possible to implement in the PSDP. For example, records with certain characteristics can be tagged as they are processed, to indicate that such records are to be ignored in further processing, or to indicate certain attributes of such records, such as if they are to be handled differently in a transactions from other records.

While the invention is of use in processing field-oriented database records, it should be understood that the system can also be used to advantage in processing many different types of data, including other field delimited data such as tables, indices, and views. The system is also advantageously used to process less structured data such as character strings, Binary Large Objects (BLOBS), XML, graphics files, and the like.

Although referred to here as a "filter" unit, it should also be understood that filter 282 can also perform other functions such as compression/decompression; encryption/decryption; certain job operations; and other administrative functions.

As one example of filtering, the PSDP 28 can be programmed to recognize that a certain set of records in a database have a specified format, for example, a preamble or "header" of determined length and format, perhaps a field, including the length of the record, followed by data including some number of fields of a certain type and length (e.g., 4-byte integers), followed by some number of fields of a different type and length (e.g., 12-byte character strings), followed by some number of fields of variable length, whose first few bytes specify the length of the field in some agreed-upon manner, and so forth.

The filter unit 281 can then execute this program as it reads data from the disk 23, locate record and field boundaries, and even employ further appropriate Boolean logic or arithmetic methods to compare fields with one another or with literal values. This allows the filter unit 282 to determine precisely which fields of which records are worth transferring to memory. The remaining records are discarded, or tagged in a manner that signals the JPU that a record need not be analyzed. Again, there will be more discussion of how this is done in detail below.

In the preferred embodiment, there are two basic reasons for which the filter unit 282 can discard a record (or mark it as unworthy of attention). The first is an analysis of the contents of the fields as described above. Using a previous example, the filter unit 282 can, for example, be programmed to check a purchase date field against a range of numbers that correspond to dates in the month of July in the year 1999, another field for a number or string uniquely associated with the North Carolina store, another field for a set of SKU (stock-keeping unit) values belonging to various styles or manufacturers of blue raincoats, and in this fashion mark only certain records for further processing. The filter unit 282 can further be programmed to know which fields contain the name and address of the customer who made the purchase, and return only these fields from the interesting records. Although other database software could perform these operations, the filter unit 282 can perform them at the same rate as the data is supplied by the disk 23. Far less data ends up in the JPU's memory as a result leaving the CPU 26 free for more complex tasks such as sorting the resulting list of names and addresses by last name or by postal code.

A second example of how the filter unit 282 can be used is to discard or mark a record, such as in record creation and deletion in a multi-user environment. Databases are not static, and it is common for some users to be analyzing a database while others are updating it. To allow such users concurrent access to the database, records can be tagged with transaction numbers that indicate when or by whom a record was created or marked obsolete. A user querying a database may not wish to see records created by another user whose activity began subsequently, or whose activity began previously but is not yet complete; if so, he probably will want to see records marked obsolete by such a user. Or the user may wish to see only the results of transactions entered by certain users, or only the results of transactions not entered by certain users. To facilitate this kind of record filtering, record headers can contain creation and deletion identifiers that the filter unit 282 can be programmed to compare with the current user's identifier to determine whether records should be "visible" to the current user. Once again, the filter unit can avoid transferring useless data to memory or relieve the CPU 26 of a time-consuming analysis task.

In the preferred embodiment there are two basic methods the filter 282 unit can filter out data that is unnecessary for a given query, thereby reducing traffic on the communications network and reducing the workload on the CPU. As described above, the filter unit 282 can simply discard the data. This is not always practical, however. Imagine a very long record with many fields, or large fields, many of which are to be returned to the CPU if the record meets the criteria, arranged in such a way that the contents of the last field are relevant to the decision to transfer or discard the selected fields of the record. Practical implementations of the filter unit 282 may not be able to store ("buffer") the largest possible set of returnable fields. In such a case, the filter unit must begin sending the selected fields to the CPU 26 before it can tell whether they should be sent. After the record has been completely processed by the filter unit, and all the selected fields transferred to the CPU 26, the filter can tag the transferred data with a bit that says "never mind", thus saving the CPU 26 and the communications network a great deal of work. In practice, the filter unit must append a length indication to every record fragment it does transfer to the CPU 26, so that the CPU 26 can find the boundaries between the record fragments the filter unit deposits in memory. This is a natural place for a status bit (or bits, if the CPU 26 must distinguish among multiple reasons) indicating the transfer of a useless record.

In addition to selecting certain fields from certain records for transfer to the CPU 26, the filter unit 282 can create and return additional fields not present on the database, by performing calculations on the contents of the fields that are present. This can further relieve the CPU 26 of work, speeding up database analysis even more. An example of this is the calculation of a "hash" function on the values of specified fields from a record, some of whose fields are to be transferred to the CPU 26. A hash function is a numerical key assigned to a collection of numeric or non-numeric field values that speeds up the process of searching through a list of records. Other examples of useful information that can be computed by the filter unit 282 include running sums or averages of field values from one record to the next. All of these benefits accrue from the filter unit's 282 ability to parse the data into records and fields as it transfers the data from the disk 23 to the CPU 26.

Another example is a transformation, such as an ASCII substitution. One usage for an ASCII substitution is to change the collation sequence of a given field. For example, if the LAST_NAME starts with the French 'ç' (ASCII 135) then the SQL clause "WHERE LAST_NAME IS>'H'" will erroneously fail unless 'ç' has been mapped to 'C' (ASCII 76). Similar issues involve the use of the UPPER( ) and LOWER( ) functions. In the preferred embodiment, the PSDP has two groups of registers, each 256 bytes long. If transformation of a given field is selected, then the PSDP setup loads transformation fields into these registers before the data is streamed in. Each register in the transformation fields corresponds to an extended ASCII value and the register contains the value that each extended ASCII character is to be converted into. In the example above, register number 135 contains the value 76. During the streaming phase, as each tuple streams through the PSDP, for those fields where a transformation is indicated, each byte is individually transformed to its converted value. Two registers are provided so that two types of transforms may be applied to different fields in a given stream, such as UPPER( ) and LOWER( ). The transforms may be applied either (a) in the "filter" path, before evaluation and comparisons or (b) in the "project" path so that a given field is converted before being output from the PSDP. This is especially useful for correcting collation sequences in preparation for the CPU performing a sort.

A more detailed discussion of the transformation/substitution of fields is contained in the co-pending patent application U.S. patent application entitled "Field Oriented Pipeline Architecture for a Programmable Data Streaming Processor," (application Ser. No. 10/665,726) referenced above.

E. Detailed Description of PSDP 28 Architecture

The preferred embodiment of the PSDP 28 is now described in further detail. The PSDP 28 is in one sense an On-Line Analytic Processing (OLAP)-oriented disk drive interface. It contains logic that is capable of identifying records, filtering out the unwanted records, and selecting fields for return. It therefore dramatically increases database analysis speed by identifying and returning selected fields from requested records.

Figure 5:
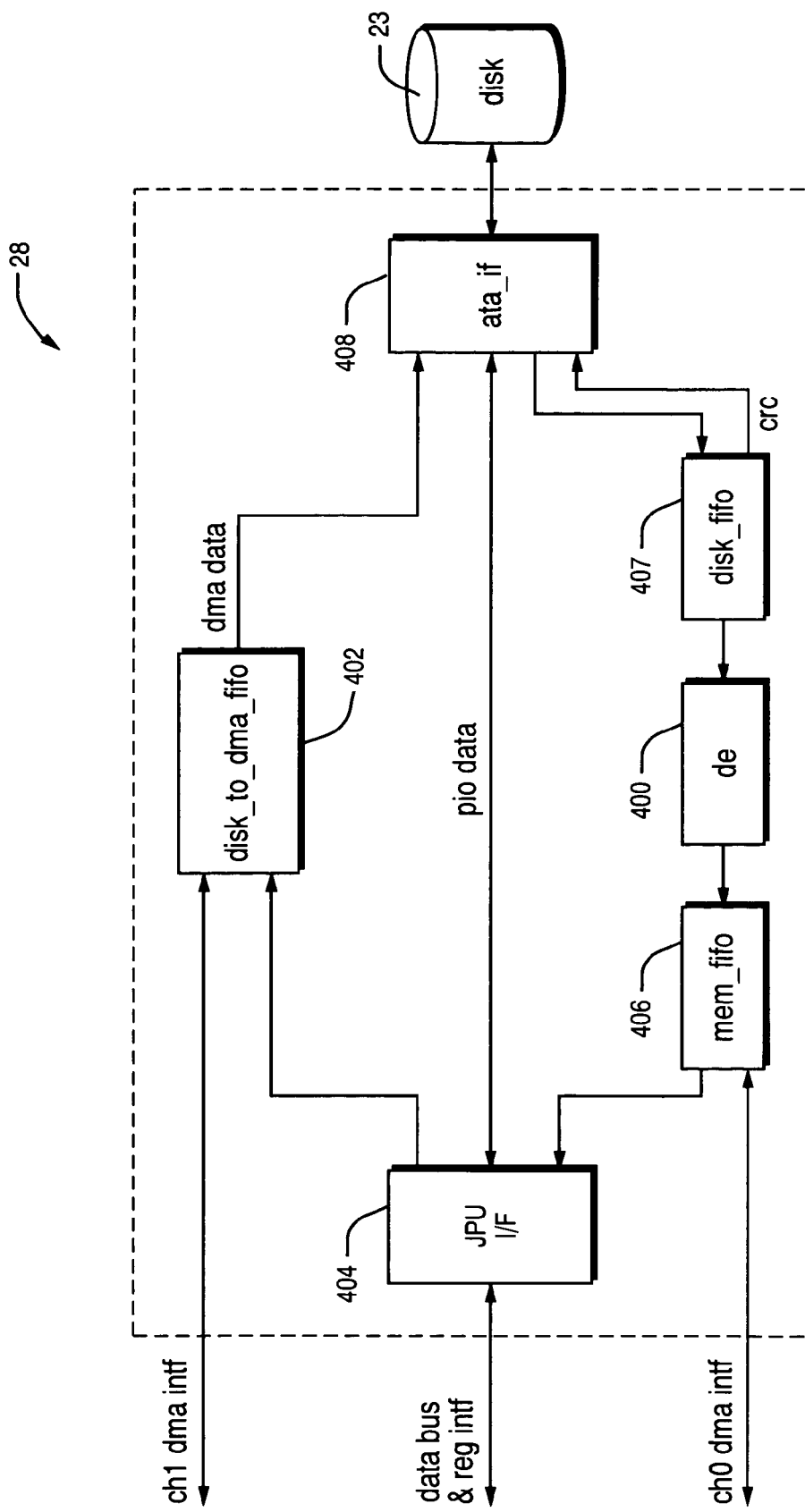
FIG. 5 is a block diagram of a Programmable Streaming Data Processor (PSDP) component.

As shown in FIG. 5, a PSDP 28 consists of a finite state machine called the Data Engine 400 to carry out filter logic and other control operations, a host interface 404, a disk interface, here the ATA interface 408 for connection to the disk 23, First-In-First-Out (FIFO) memories 406 and 407, and a DMA host driver 402.

The PSDP 28 has two major functions: to act as disk controller 281 while moving data between memory and the disk 23, and to process or "filter" 282 disk data during filtered reads from the disk 23. In acting as the disk controller 281, the PSDP translates signaling used on the JPU, such as PowerPC compatible interface signaling to the interface used in the disk 23, such as the Integrated Device Electronics (IDE) (also known as Advanced Technology Attachment (ATA)) interface as defined by ANSI NCITS 340-2000. The PSDP 28 supports both a Programmed I/O (PIO) Mode-2 for register access and a UDMA (Ultra-Direct Memory Access) mode-4 for data transfers.

The terms "flow through" and "filtered" are used to differentiate DMA reads. In flow-through mode, also referred to as raw read mode, data moves directly from the input to the output of the data engine without being filtered. Data that is filtered has been processed, perhaps by culling records via the comparison and/or transaction ID circuits, but certainly by reformatting the records into tuple format, during which uninteresting fields can be dropped and PSDP-generated fields added. The processing of culling records is called the "restrict". The process of formatting fields into tuples is called the "project".

There are three DMA modes: write, raw read, and filtered read. For all three, the PSDP 28 shadows the read/write disk command in order to control its own DMA state machines. It does not shadow the disk address or sector count, nor does it have access to the memory addresses. For writes and raw reads, the PSDP 28 blindly moves data from one interface to the other until the JPU 22 disables the mode. The JPU 22 knows the quantity of data to be moved for these modes and uses the disk and DMA controller interrupts to identify the end of transfer. For filtered reads, the quantity of data to be transferred to memory is generally unknown, and the JPU identifies the end of transfer from the disk and filter interrupts. All of the record information—header and data—can be projected during a filtered read, but the block header info can only be returned by a raw read. DMA data integrity is protected across the disk interface by the IDE CRC check.

As mentioned already, during disk read operations, the PSDP 28 can filter data (or perform other operations on the data) as it is being read from the disk 23. More specifically, the PSDP parses the disk data and identifies block, record, and field boundaries. Data from specified fields are transformed and compared with data from other fields or with constants. The comparisons are combined to determine if a record is wanted (this is referred to as a restricted scan of the database). If so, data from fields to be returned (referred to as selected or projected fields) are returned to JPU memory. If a record is not wanted, the PSDP ignores it and proceeds to the next record. Details are in the Filter Unit section.

As alluded to above, the PSDP 28 operates in two modes. It can return raw disk sectors in block read mode; and it can process the records within the disk block and selectively return specified fields in filtering mode. [A special case of filtering mode is the return of all records without any modifications whatsoever, with or without any record header elements.] In filtering mode, the Filter Unit 282 pulls disk blocks from a Disk Read FIFO, feeding them through the Block Header, Record Header, NULL Vector, Transaction ID, Field Parse, and Filter circuits. Fields to be returned are pushed into the Memory Write FIFO. Notice that this version of the chip does not return transformed fields. In fact, the only tuple entries created by the PSDP are the record address, tuple length, and tuple status.

The terms "flow through" and "filtered" are used to differentiate DMA reads. In flow-through mode, also referred to as raw read mode, data moves directly from the input to the output of the data engine without being filtered. Data that is filtered has been processed, perhaps by culling records via the comparison and/or transaction ID circuits, but certainly by reformatting the records into tuple format, during which uninteresting fields can be dropped and PSDP-generated fields added. The processing of culling records is called the "restrict". The process of formatting fields into tuples is called the "project" (as in throwing something, not as in this document).

There are three DMA modes: write, raw read, and filtered read. For all three, the PSDP shadows the read/write disk command in order to control its own DMA state machines. It does not shadow the disk address or sector count, nor does it have access to the memory addresses. For writes and raw reads, the PSDP blindly moves data from one interface to the other until the JPU disables the mode. The JPU knows the quantity of data to be moved for these modes and uses the disk and DMA controller interrupts to identify the end of transfer. For filtered reads, the quantity of data to be transferred to memory is generally unknown, and the JPU identifies the end of transfer from the disk and filter interrupts. All of the record info—header and data—can be projected during a filtered read, but the block header info can only be returned by a raw read. DMA data integrity is protected across the disk interface by the IDE CRC check.

The Data Engine 400, as shown in FIG. 5, includes filter logic 500, a data parser block 502, header storage 504, transaction ID processing 510, error checking 506, and output tuple generator 508. In general, the data parser 502 is responsible for taking information from the disk 23 and formatting it into headers and fields so that the filter logic 500, header storage 504 and error checking 506 blocks can perform their respective tasks. The tuple generator takes the output of the filter and TID processing blocks and formats the results in a "tuple", suitable for processing by the JPU 22 or host 12.

Raw user table data as read from the disk 23 is understood and interpreted by the data parser 506. In one preferred embodiment at the present time, user table data is stored on disk in 128 KB segments called "blocks". Each block begins with an 8-word header, followed by 0 or more records. The format of the block header may be as follows:

| Block Header Field | Size | Details |
| --- | --- | --- |
| Magic number | 4B | identifies beginning of block, always "FEEDFACE" |
| CRC-32 | 4B | not used |
| Block number | 4B | within the table, 0 based, only 19 significant bits |
| Block address | 4B | starting sector number of the block |
| Block length | 4B | in bytes, including header, but not trailing 0's |
| Layout ID | 4B | like a version number on the data format |
| Table ID | 4B | the Postgres object ID that uniquely identifies the table |
| Sector count | 1B | defines block size, 0 means 256, as of this time, it's always 0 |
| Record count | 3B | number of records in the block, 0 means 0 |

The CRC-32 is meant to be computed by software and written to the disk along with the rest of the block header. Its calculation was to include all data from the block number through the end of the last sector of the block, including any trailing 0's. Its primary purpose was to detect data corruption resulting from hardware or software bugs, but it could have detected disk data-retention problems as well. It is unrelated to the UDMA-mode CRC-16 calculation required by the ATA-5 specification, which only guards the physical interface between the PSDP and disk-drive IO buffers.

The sector count is the number of sectors in the block, which must be from 1 to 256. Thus a 0 in this 1-byte field means 256. The sector count occupies the most-significant byte of the last word of the block header.

The record count is the number of records in the block, which may be 0. Although the record count occupies the least-significant three bytes of the last word of the block header, only 13 bits are used.

A record is typically composed of a record header and one or more data fields, where the record header consists of three special fields, a length, and a null vector. The special fields are the row number, created transaction ID, and deleted transaction ID. All of the record header entries are optional on a per-table (not per-record) basis. However, if the record has a null vector, it must also have a record length, but not vice versa. The data types are described above in the data types section.

| Record Header Field | Size | Detail |
| --- | --- | --- |
| Row number | 0 or 8B | existence per RowNumberSize register |
| Created XID | 0 or 8B | existence per CreatedXIDSize register |
| Deleted XID | 0 or 8B | existence per DeletedXIDSize register |
| Record length | 0 or 2B | size per RecordLengthSize register |
| Record NULL vector | 0 to 512B | size per FieldCount register |

The row number (sometimes called row_num) is the unique number of the row or record in the user's table. It is distinct from the row address (sometimes called row_addr), which is the complete physical address of a row in node-table-block-record format. The row number is also distinct from the record number, which is the 0-based ordinal number of a record within a block. The record number is the final component of the row address. The row address is computed by the PRSP.

The created XID contains the number, or ID, of the transaction that created the record.

The deleted XID. In the preferred embodiment, records are not actually deleted. Rather, they are marked as deleted so they can be restored if the transaction that did the deleting is rolled back. (There are system management tools to reclaim the space.) A value of 0 indicates the record has not been deleted. A value of 1 indicates that the record was created by a transaction that was rolled back. These XIDs support a multi-version database system.

The record length is the length of the record in bytes, excluding the row number and the transaction IDs, but including the record length, the record null vector, the data fields, and any pad bytes at the end of the record needed for proper alignment of the first item of the following record. Thus, it is the distance in bytes from the beginning of the record length field to the beginning of the next record. Note that although all records in a table must have the same makeup, record lengths may vary because of variable-length character fields. The RecordLengthSize register defines record length sizes of 0, 1, 2, and 4 bytes, but only 0 and 2 are used.

The record null vector specifies which fields in the record are null, thereby indicating validity, not existence. For instance, a null varchar is not the same as an empty one. The record null vector consists of an even number of bytes. If it exists, the record null vector has the same number of bits as the record has data fields, and computes the number of half-words in the null vector as (FieldCount+15)>>4. This vector is an array of bytes. Bit 0 of the byte immediately following the record length corresponds to the $0^{th}$ data field; bit 7 of that byte corresponds to the $7^{th}$ data field; bit 0 of the last byte of the word that contains the record length corresponds to the $8^{th}$ data field; and so on.

There are strict rules governing field order and alignment. Both the record and its first data field must start on a word boundary (addr[1:0]=0). All record fields are self-aligned up to word boundaries. This means that 16, 12, 8, and 4 byte fields are word-aligned, 2-byte fields are ½-word-aligned (addr[0]=0), and 1-byte fields can start anywhere. The row number, created XID, and deleted XID are all 8 byte fields and do not require pad bytes to align them. If there is a record length but no record null vector, two pad bytes are required following the record length. If the record null vector exists, it immediately follows the record length and naturally starts on a two-byte boundary, but two pad bytes may be required following the record null vector to properly align the first data field. The physical order of data fields, which often is not the same as the logical order, takes care of aligning non-character data fields; the physical order is N16, T12, N8, 18, F8, N4, 14, F4, D4, 12, D2, I1, C1, . . . C16, V2. The fixed-length character fields are packed in as tightly as possible and are not aligned. Variable-length character fields start with a 2-byte length; they are ½-word-aligned and may require a preceding pad byte. Up to three pad bytes may follow the record's last data field in order to align the next record. If so, they are counted in the length of the earlier record. More details of TID processing are contained in a co-pending U.S. patent application entitled "Controlling Visibility in Multi-Version Database Systems" by Foster D. Hinshaw et. al. filed in the U.S. Patent and Trademark Office on Aug. 22, 2003.

A project function encompasses the selection of record fields, the generation of new fields, and the tuple formation and return. Tuples typically consist of a row number, some data fields, and a 2-byte length/status, but they can also include the created and/or deleted transaction IDs, the row address, up to 255 pad words, the 32 instructions results formed into a boolean word, the hash result, and a null vector.

The hash is used to organize similar tuples into groups for processing joins or grouping selects, and with the exception of the record null vector and length/status, all record-header and data fields can be used in its calculation. There are 7 defined hash modes, such as full CRC, which calculate a 32-bit CRC hash starting with a seed of zero and using all of the bytes of all of the fields selected. Blank spaces in character fields are skipped, as are leading 0's in positive and unsigned numbers and leading 1's in negative numbers. Hash operations are defined on a per-field basis by the comparison instructions.

Within the PSDP 28, a "tuple" is used to describe projected data as provided by the tuple generator 508. The tuple generator 508 uses principally the filter 500 output but can also use TID processing 510 and error checking 506 outputs. The term "tuple" is used here for the purpose of differentiating disk 23 and PSDP 28 output record formats. A tuple contains fields projected from the source record and up to six "virtual" fields: row address, pad words (tuple scratch pad), the boolean results from each of the filter operations, a hash result, the tuple null vector, and the tuple length. All are optional on a per-table basis. The order of these fields is given in the following table.

F. Query Processing Example

As an aid in the illustrating how the system 10 processes data, an example database will be described that contains store sales data. The database defines a SalesDetail data table, a Customer data table, and a Store data table as follows:

```
SalesDetail
    StoreID
    CustomerID
    SaleDate
    ProductCategory
    Units
    Amount
Customer
    CustomerID
    Gender
Store
    StoreID
    StoreLocation
```

A sample query might be to "show me the total units and dollar amount of rain gear sold to females in North Carolina in 2000, by customer ID." This can be translated into the SQL statement:

```
SELECT SalesDetail.CustomerID AS "CustID",
    Sum(SalesDetail.Units) AS "Sales Units",
    Sum(SalesDetail.Amount) AS "Sales Amount"
FROM SalesDetail, Customer, Store
WHERE SalesDetail.StoreID = Store.StoreID
    AND SalesDetail.CustomerID = Customer.CustomerID
    AND Store.StoreLocation = "NC"
    AND Customer.Gender = "Female"
    AND Year(SalesDetail.SaleDate)="2000"
    AND SalesDetail.ProductCategory = "Raingear"
GROUP BY SalesDetail.CustomerID;
```

An output from this sample query with the total units and dollar amount of rain gear sold to females in North Carolina in 2000 by customer ID might be shown in tabular format:

| CustID | Sales Units | Sales Amount |
|--------|-------------|--------------|
| 021442 | 1,300 | $45,000 |
| 021443 | 1,200 | $41,000 |
| 021449 | 1,800 | $60,000 |
| 021503 | 3,500 | $98,000 |
| 021540 | 4,200 | $112,000 |
| 021599 | 5,000 | $150,000 |
| 021602 | 4,700 | $143,000 |
| 021611 | 4,100 | $104,000 |
| 021688 | 3,600 | $101,000 |
| 021710 | 2,000 | $65,000 |
| 021744 | 1,200 | $41,000 |
| 021773 | 1,500 | $43,000 |

The mechanism for processing this query to produce these results involves a series of steps. Referring to FIGS. 1 and 3, the query is passed from the user (for example, Business Intelligence Application 30) over the external network 33 to the host 12. On the host 12, the Plan Generator 204 then creates tentative execution plans.

An execution plan describes the query processing steps that are required to produce results. Some of these steps can be executed in parallel, while others must be executed in sequence. Different steps may be optimally executed in different processing locales. Some steps, such as sorting large amounts of data, can benefit from fast processors with lots of shared memory, as may be the case in an SMP environment. Some steps, such as reading lots of data from disk, can benefit from running in a massively parallel environment, where I/O can be overlapped. Still other steps, such as filtering a stream of data, can benefit from specialized hardware circuits that can perform simple comparisons at streaming speeds.

The Plan Optimizer 205 selects an execution plan, optimizes that plan, annotates the steps of the plan to note dependencies between steps and optimum processing locales, and passes it to the Plan Link 206. The Plan Link 206 expands the plan as necessary, based on where parts of the plan will be executed, resulting in a sequence of Jobs, in which each job is a group of steps that can be performed as a sequential unit within a processing locale.

The execution plan for the example query is shown below. It consists initially of a sequence of seven jobs, each job performing a portion of the work required for evaluating the query.

| Job | Needs | Locale | Operation$_{[csh5]}$ |
|-----|-------|--------|-----------|
| 1 | 0 | JPU | SCAN Customer |
|   |   | PSDP | RESTRICT Gender = "Female" |
|   |   | PSDP | PROJECT CustomerID |
|   |   | JPU | SAVE AS TEMPCustomer |
| 2 | 0 | JPU | SCAN Store |
|   |   | PSDP | RESTRICT StoreLocation = "NC" |
|   |   | PSDP | PROJECT StoreID |
|   |   | JPU | BROADCAST AS TEMPStore |
| 3 | 1&2 | JPU | SCAN SalesDetail |
|   |   | PSDP | RESTRICT ProductCategory = "Raingear" AND Year(SaleDate)="2000" |
|   |   | PDSP | PROJECT CustomerID, StoreID, Units, Amount |
| [4] | 3 | JPU | JOIN WITH TEMPStore, StoreID=TEMPStore.StoreID |
|   |   | JPU | PROJECT CustomerID, Units, Amount |
| [5] | 4 | JPU | JOIN WITH TEMPCustomer, CustomerID=TEMPCustomer.CustomerID |
|   |   | JPU | PROJECT CustomerID, Units AS "Units", Amount AS "Amt" |
| [6] | 5 | JPU | GROUP By CustomerID |
|   |   | JPU | AGGREGATE Sum(Units) AS "Units", Sum(Amt) AS "AmtTotal" |
|   |   | JPU | PROJECT CustomerID, "Units", |
|   |   | JPU | "AmtTotal" RETURN HOST |
| 7 | 6* | HOST | RETURN USER |

For example, Job 1 directs each JPU 22 to scan the portion of the Customer table that is local to its disk 23, then to use the specialized PSDP 28 to filter out everything from the Customer table except the identifiers of female customers, and then to store those CustomerIDs in a temporary file on the JPU 22's local disk 23.

Similarly, Job 2 scans the Store table, bringing into the JPU 22's memory 27 only the identifiers of stores in North Carolina, and since this is a relatively small set of data, broadcasting the resulting set of identifiers to all JPUs 22, where they are then accumulated and saved in memory as TEMPStore. Jobs 1 and 2 do not depend on any other jobs, and are specified to run concurrently if possible.

When two or more jobs sharing the same processing locale must execute in sequence, the system combines them together into a single job, and avoids intermediate materialization. In the example given, Jobs 3 through 6 form such a sequence, and are combined by the Host Dispatch 208 into on streaming job. This combined job scans the SalesDetail table, with its restrictions and projections. As the tuples are received from scan and filtered through the PSDP 28, each tuple is joined with TEMPStore and TEMPCustomer and aggregated. On the aggregation node, as each new customer ID is received, the previous one and its sums are sent to the host, where Job 7 is then invoked in a streaming fashion, to return the aggregated tuples through the ODBC connection 38 back to the user.

After it potentially combines jobs, the Host Dispatch 208 then sends individual Jobs within the plan to the respective locales (e.g., the JPUs 22 or the LJPUs 30) for execution. In this example, jobs 1-6 are sent to the JPUs 22 for execution, with job 7 reserved for the host 12.

Figure 7:
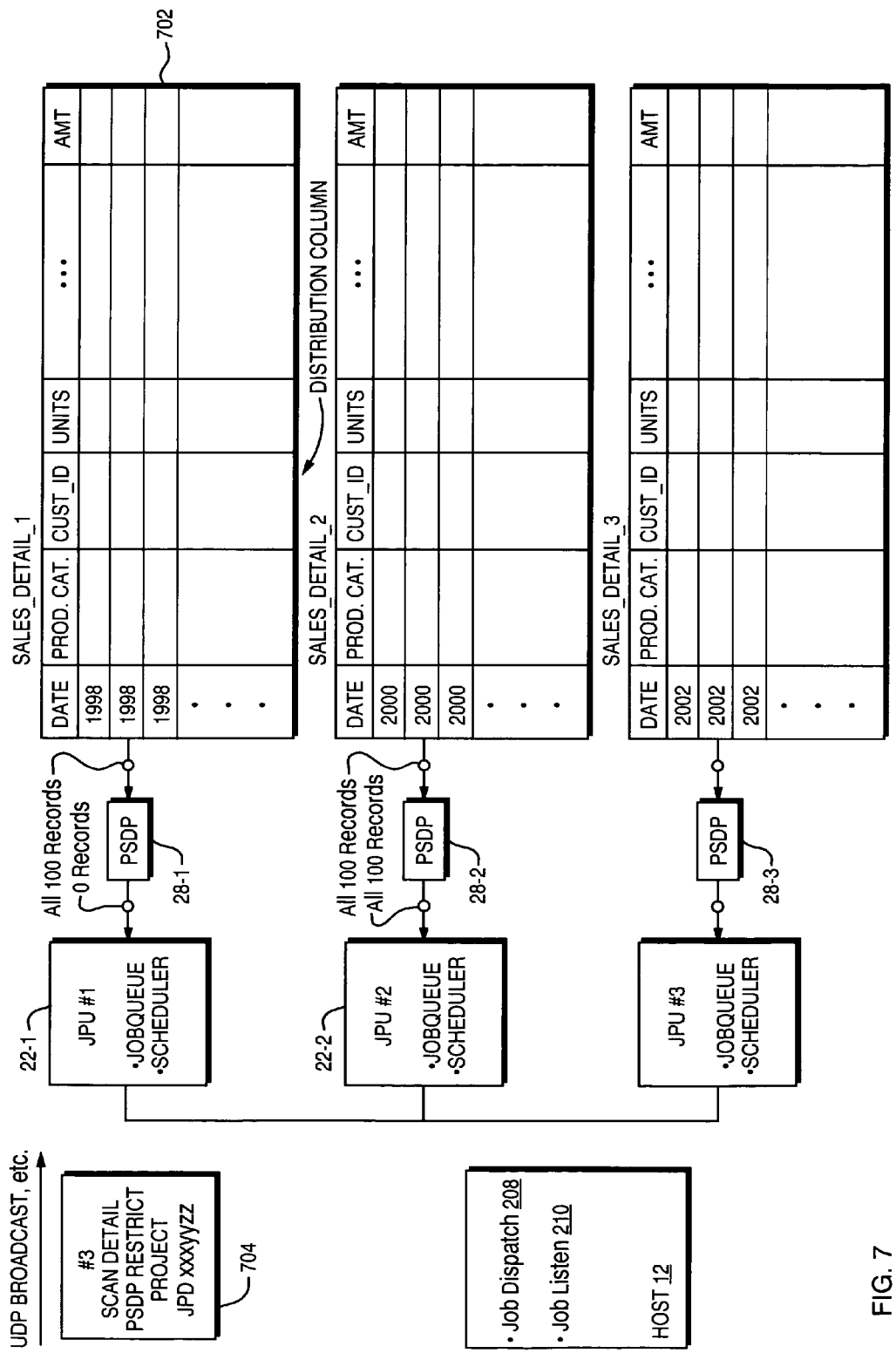
FIG. 7 is a flow diagram illustrating how different JPUs process a particular assigned job at different times, depending upon conditions local to each JPU.

FIG. 7 is a diagram illustrating how an exemplary job is processed by a set of JPUs 22, in the second group. An example Job 3 (replicated here again) included instructions

| 3 | JPU | SCAN SalesDetail |
|---|---|---|
|   | PSDP | RESTRICT ProductCategory = "Raingear" AND Year(SaleDate)="2000" |
|   | PDSP | PROJECT CustomerID, StoreID, Units, Amount |

Individual jobs are forwarded from the host 12 to typically many JPUs 22 (and to the LJPUs if specified as a locale for the job) in parallel as a message sent via the communication layers described above. While the messages are typically sent as a User Datagram Protocol (UDP) type broadcast message to all JPUs in parallel, it should be understood that unicast messaging can also be used, and that other protocols such as Transmission Control Protocol (TCP) can also be used. More details of messaging protocols suitable use with the invention can be found in our co-pending U.S. patent application Ser. No. 10/145,564 filed May 13, 2002, entitled "Network Interface For Distributed Intelligence Database System", by Hinshaw et al.

Upon receipt of a job message at the job listener 301, the JPU dispatch unit 304 adds the job to a queue of pending jobs. The JPU Resource Scheduler 322 subsequently schedules the job for execution based on factors that can include the availability of memory or disk or I/O resources for processing the job. As shown in FIG. 7, the typical system 10 has a number of JPUs 22-1, 22-2, 22-3, each capable of queuing and scheduling jobs independently of the other JPUs 22.

In this example, the SalesDetail table would have already been distributed across multiple JPUs. In the illustrated example, three JPUs store various non-overlapping portions of the SalesDetail table. Thus a given JPU is said to "own" the data (records) sent to it for the purpose of insertion or loading.

When a table is created, one of its fields may be selected (such as the CustomerID field 702) to distribute records more or less evenly across the multiple JPUs 22. Thus, for example, if there were 900 Sales Detail records and three JPUs 22, then the host 12 would distribute approximately 300 records per JPU based upon the value of the CustomerID field. One scheme for distributing data records to JPUs 22 is described in co-pending U.S. patent application entitled "Disk Mirror Architecture for Database Appliance", by Hinshaw, et al., filed on Sep. 18, 2003.

Any such distribution may not be random for all fields, however. For example, the distribution of records may be such that JPU 22-1 contains a preponderance of SalesDetail records with a 1998 date, while JPU 22-2 contains a preponderance of SalesDetail records with a 2000 date. In the example shown, the RESTRICT operator of Job 3 passes only those SalesDetail records with a year of 2000. Therefore, JPU 22-2 may have more data records to process than other JPUs 22-1 or 22-3. This is, in part, at least one reason why a particular JPU may finish a job sooner than another JPU.

Each JPU Resource Scheduler 322 allocates a priority to the jobs in its queue based upon resource availability conditions local to its respective JPU 22. For example, JPU memory is often a high demand resource, and jobs that make a high relative demand on memory reserves may be given lower priority than other jobs. Other schemes can use other parameters to determine the priorities to be assigned to various jobs, such as desired completion time, or estimated demands on other resources such as local JPU disk and/or network I/O demand, user specified priority, and the like.

In the example illustrated in FIG. 7, JPU 22-1 will typically finish its operations first before JPU 22-2. This is because the RESTRICT operation, requiring selection of records where the "Year" field is equal to "2000", will pass through fewer records for processing in subsequent steps than will be passed through on JPU 22-2. In the simple example given, there were no other steps after the RESTRICT and PROJECT. However, if Job 3 included a fourth step to SORT the data resulting from the PROJECT step, then JPU 22-2 would have additional processing on the order of N*logN where N was the number of SalesDetails records passing the RESTRICT step. JPU 22-1 would thus be freed to perform other jobs for the same query, or even other jobs for different queries, as soon as it finishes processing its own data.

When any record is created, such as a SalesDetail record in this example, it is distributed to a particular JPU. In the preferred embodiment, each record is processed exclusively by the JPU on which it was created, so long as that JPU is operational and so long as the record is accessible to that JPU. The record may be replicated to other JPUs for mirroring purposes, but such replicas are not used for normal job processing.

Even though JPU 22-2 may require more time to process Job 3 than does JPU 22-1, JPU 22-1 cannot help JPU 22-2 by processing some of its data. This frees JPU 22-1 to do other work.

This architecture can be thought of as asymmetric scheduling scheme, whereby each JPU 22 is able to schedule jobs for itself, without regard to how jobs are scheduled for other JPUs. It allows each JPU to complete its assigned tasks independently of the other JPUs, thereby freeing it to perform other tasks. In the simple example presented in FIG. 7, no great advantage is evident since there is only a single job illustrated. However, in the typical environment where many users or applications are making queries at the same time, it can be appreciated that the job queue within a given JPU 22 will quickly become filled with different jobs of varying demands and priority. In such an environment, by making the JPU operations asynchronous, overall throughput is greatly increased.

This asynchronism in job execution by the JPUs 22, however, should not be carried forward in the result reporting by the Host 12 to the application 30. The job listener component 210 in the host 12 thus acts to first coordinate job responses from multiple JPUs. In particular, the job listener 210 waits to receive results data from each JPU before reporting back to the Host Event Handler 252 that a particular job has been completed.

To expedite this, each job can be tagged with a unique job identifier (JID) 704. When each JPU returns results of a particular job to a host, the JID is included, as well as an identifier for the particular JPU. The Host Event Handler 252, thus knowing how many JPUs 22 are active, can then tally responses from the JPUs to ensure that job identifiers are received from each, before taking the next step in a plan that has jobs that must be run sequentially, and before ultimately reporting the results back to the application.

As alluded to previously, JPU-assigned jobs can run asynchronously and in parallel. In the example being described, Jobs 1 and 2 can run concurrently and therefore be dispatched to the JPUs 22 at the same time. However, Job 3 must only be run after both Jobs 1 and 2 have been completed. Thus, Execution Engine 360 will not permit Host Dispatch 208 to issue Job 3 until Jobs 1 and 2 are complete.

Figure 8:
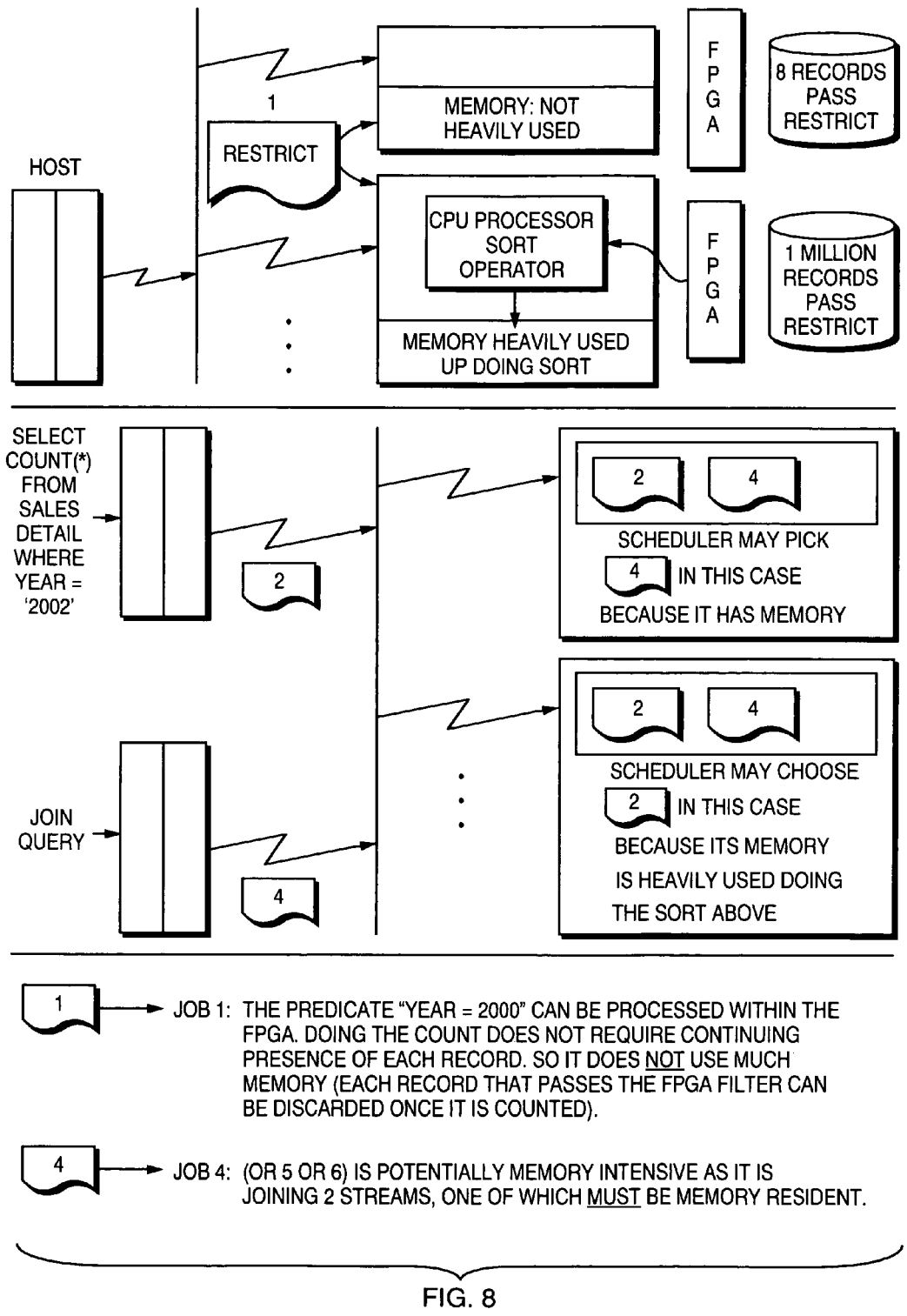
FIG. 8 illustrates an example job queue scenario.

FIG. 8 is an example scenario where two JPUs 22-1 and 22-2 execute jobs that result in different priorities being assigned to the same job. Here, the JPUs 22 have already performed an earlier task, such as a Job 1:

| | |
|---|---|
| JPU | SCAN SalesDetail |
| PSDP | RESTRICT ProductCategory = "Raingear" AND Year(SaleDate)="2000" |
| PDSP | PROJECT CustomerID, StoreID, Units, Amount |
| JPU | SORT by CustomerID |

This is similar to Job 3 of the earlier example, but with a subsequent sort step. Given the data distribution discussed above for FIG. 7, the first JPU 22-1 has very few records that pass the RESTRICT, so that the sort step completes quickly and its local memory is relatively free after finishing Job 1.

However, the second JPU 22-2 had many, many records pass the RESTRICT (such as one million records), and its local memory may now be heavily used in the process of executing the last sorting step of Job 3.

As a next sequence of events, the host 12 has generated a pair of additional jobs, including a Job 2 requesting that a SalesDetail table be processed to count all records where the Year field is equal to 2000, and a Job 4 that is a JOIN of two SCANS. For Job 2, the count operation does not require the continuing presence of each record, merely a running total. Such a job does not make particularly large demands on memory local to the JPU 22, since each record that is processed is simply discarded once it is counted.

Job 4 however, is a more complicated job in the sense that to perform a JOIN which requires instantiation of at least one data set in the JPU's memory. Job 4 therefore makes higher demands on local memory.

With this scenario, the JPU Resource Scheduler 322 may choose to schedule Job 4 first on JPU 22-1, prior to allowing Job 2 to run (or at least with a higher priority than Job 2). This is because the prior Job 1 did not make very heavy demands on local memory, and so sufficient memory is available to process Job 4.

However, in the case of JPU 22-2, the scheduler 322 may choose Job 2 to execute first, and then Job 4. This may be a result of the fact that JPU 22-2's memory is already heavily loaded as a result of performing Job 1. It may not have enough spare memory to support Job 4, but yet have enough to complete Job 2.

While this invention has been particularly shown and described with references to preferred embodiments thereof, it will be understood by those skilled in the art that various changes in form and details may be made therein without departing from the scope of the invention encompassed by the appended claims.

What is claimed is:

1. An asymmetric data processing system comprising:
   a first group of one or more host computers, each comprising a memory, a network interface and one or more Central Processing Units (CPUs), each host computer accepting and responding to requests to process data;
   a second group of two or more Job Processing Units (JPUs), operating autonomously and asynchronously from one another, each JPU comprising a memory, a network interface, a data interface with exclusive access to one or more sources of data, and one or more general purpose CPUs, each JPU in the second group being responsive to requests received from a host computer to execute jobs and return results independent of execution at other JPUs, the jobs containing instructions for the processing of a particular subset of data under the JPU's exclusive control; and
   a network connecting the network interfaces within each group and between the two groups;
   wherein the sources of data comprise one or more storage devices which are directly accessed by no other JPU in the second group and by none of the host computers in first group.

2. The system of claim 1 wherein the data comprises structured records.

3. The system of claim 1 wherein the data comprises a mixture of fixed and variable length fields of various data types.

4. The system of claim 3 wherein the data further comprise header information describing fields with null values and offsets of variable length fields.

5. The system of claim 1 wherein autonomous operation is such that host computers in the first group do not coordinate processing across JPUs.

6. The system of claim 1 wherein asynchronous operation is such that host computers in the first group operate in synchronism with the JPUs.

7. The system of claim 1 in which JPUs in the second group manage the storage devices autonomously, such that they have exclusive responsibility for the mapping between the location and representation of data in memory and the location and representation of data within the storage devices.

8. The system of claim 7 in which JPUs in the second group manage their associated local storage devices by performing at least one function selected from a group consisting of: storage allocation and deallocation; insertion, deletion and retrieval of records; creation and deletion and maintenance of tables, views and indices; mirroring and replication; and compression and decompression.

9. The system of claim 8 in which the JPUs in the second group further comprise a storage manager component which is responsible for hiding details of storage management from other components of the JPUs.

10. The system of claim 9 in which the storage manager component checks requests to insert record data into a table to ensure that the record data conforms to the table's definition.

11. The system of claim 1 in which the JPUs in the second group manage transactions autonomously, containing software which is responsible for at least one of the following functions: starting, pre-committing, committing and aborting transactions against data on the JPU.

12. A system as in claim 1 wherein the JPUs in the second group control concurrent access to data that is local to the JPU, containing software which is responsible for locking the local data and identifying dependencies between transactions that process local data.

13. System of claim 1 in which the JPUs in the second group perform mirroring autonomously, by ensuring that modifications to data local to a first JPU are replicated redundantly on another device.

14. System of claim 13 in which the device containing replicated data of the JPU is a second JPU.

15. The system of claim 1 in which the JPUs in the second group may receive new jobs before completing older jobs, and where the resources required to satisfy jobs are scheduled locally and autonomously by the JPUs that own the resources.

16. The system of claim 1 wherein the JPU's report job results to at least one host.

17. The system of claim 16 wherein jobs are assigned a job identifier and wherein the host additionally coordinates completion of jobs by determining when all active JPU's report results for a particular job.

18. The system of claim 16 wherein the JPU's further provide a JPU identifier with results data, so that job completion can be coordinated by all active JPU's.

19. The system of claim 18 wherein coordination of results is performed by a Large Job Processing Unit (LJPU) in a third group of processors.

20. The system of claim 1 wherein a host in the first group sends a job to a plurality of JPUs in the second group by broadcasting a message containing the job onto the network, without specifying the identity of any JPUs to receive the job.

21. The system of claim 20 wherein the JPUs that receive the same jobs from one or more hosts may process those jobs in different orders and at different times.

22. The system of claim 1 wherein each JPU in the second group further comprises a scheduling component, and each JPU processes its assigned jobs and returns results to a requesting host in the order and at the time that the scheduling component specifies.

23. The system of claim 1 in which a host that issues a request to multiple JPUs accepts replies from the JPUs when provided under control of the JPU operating autonomously, and not in any order specified by the host.

24. The system of claim 1 in which at least one JPU has an operating system capable of receiving and processing multiple jobs at a given time.

25. The system of claim 24 wherein the operating system supports overlapping job execution.

26. The system of claim 1 in which JPUs in the second tier are embedded components that are not directly accessible to applications that present data processing requests to the hosts.

27. The system of claim 26 in which execution of requests made by a first application cannot affect the correct execution of requests made by other applications.

28. The system of claim 26 in which a pre-existing application that makes a request in a standard query language of the system, results in the host distributing jobs to one or more JPUs in the second group, without having to change the pre-existing application.

29. The system of claim 1 in which the data processed by the host computers in the first group is partitioned into two or more subsets, such that the processing of data in each subset is the primary responsibility of no more than one JPU.

30. The system of claim 29 in which the identity of a JPU primarily responsible for processing a given subset of data is determinable as a function of the data.

31. The system of claim 30 wherein the LJPUs have an execution engine responsible for coordinating results from the JPUs.

32. The system of claim 1 additionally comprising:
a third group of Large Job Processing Units (LJPUs), each LJPU being responsive to jobs, the LJPUs having greater memory and processing capabilities than the JPUs; and
network also connects LJPUs in the third group to the computers of the other groups.

33. The system of claim 32 wherein LJPUs share memory resources.

34. The system of claim 1 wherein the computers in the first group are arranged in a symmetric multiprocessing architecture.

35. The system of claim 1 wherein the computers in the second group are arranged in a massively parallel architecture.

36. An asymmetric data processing system comprising:
a first group of one or more host computers, each comprising a memory, a network interface and one or more Central Processing Units (CPUs), each host computer accepting and responding to requests to process data;
a second group of two or more Job Processing Units (JPUs), operating autonomously and asynchronously from one another, each JPU comprising a memory, a network interface, a data interface with exclusive access to one or more sources of data, and one or more general purpose CPUs. each JPU in the second group being responsive to requests received from a host computer to execute jobs and return results independent of execution at other JPUs, the jobs containing instructions for the processing of a particular subset of data under the JPU's exclusive control; and
a network connecting the network interfaces within each group and between the two groups;
wherein the sources of data comprise an external source of streaming data, such that the streaming data is directly accessed by no other JPU in the second group and by none of the host computers in the first group.

37. An asymmetric data processing system comprising:
a first group of one or more host computers, each comprising a memory, a network interface and one or more Central Processing Units (CPUs), each host computer accepting and responding to requests to process data;
a second group of two or more Job Processing Units (JPUs), operating autonomously and asynchronously from one another, each JPU comprising a memory, a network interface, a data interface with exclusive access to one or more sources of data, and one or more general purpose CPUs, each JPU in the second group being responsive to requests received from a host computer to execute jobs and return results independent of execution at other JPUs, the jobs containing instructions for the processing of a particular subset of data under the JPU's exclusive control; and
a network connecting the network interfaces within each group and between the two groups;
wherein JPUs in the second tier are embedded components that are not directly accessible to applications that present data Processing requests to the hosts; and
wherein the hosts in the first group are exclusively responsible for interfacing to external applications, thereby supporting the use of JPUs having different processing capabilities, without requiring changes to be made to the applications making requests.

* * * * *

UNITED STATES PATENT AND TRADEMARK OFFICE
CERTIFICATE OF CORRECTION

PATENT NO.        : 7,634,477 B2                                           Page 1 of 1
APPLICATION NO. : 10/667128
DATED             : December 15, 2009
INVENTOR(S)       : Foster D. Hinshaw It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1185 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,634,477 B2                  Page 1 of 2
APPLICATION NO. : 10/667128
DATED : December 15, 2009
INVENTOR(S) : Foster D. Hinshaw It is certified that error appears in the above-identified patent and that said Letters Patent is hereby corrected as shown below:

In the Drawings

Sheet 1, Fig. 1, at upper left-hand corner, replace "LOCAL APP. 20" with --LOCAL APP. 21--; add reference numeral --20-- at the bottom of the right-hand area for MPP Execution Engine; in LJPU 30 block, replace bottom block "32-1" with --32-p--; in LJPU 30 block, replace "MEM 33" with --MEM 38--; and add reference numeral --34-- to the vertical bus line shown in the right-hand area of the figure.

Sheet 3, Fig. 3, replace "Host Disk Manager 250" with --Host Disk Manager 215--; on left-hand side of Fig. 3, add reference numeral --242-- below CUBE BUILDER.

Sheet 4, Fig. 4A, replace reference numeral "300" in upper right-hand corner with --22--; add reference numeral --300-- with a connection to top block COMM in upper left-hand portion of Fig. 4A.

Sheet 5, Fig, 4B, replace reference numeral "350" in upper right-hand corner with --30--; add reference numeral --350-- with a connection to top block COMM in upper left-hand portion of Fig. 4B; and replace "LJPU BOOT/INIT 374" with --LJPU BOOT/INIT377--.

In the Specification

Column 8, line 39, replace reference numeral "28" with --21--; line 40, replace reference numeral "30" with --39--; and line 54, replace reference numeral "11" with --16--.

Column 10, line 22, replace reference numeral "22" with --30--; and line 44, replace reference numeral "20" with --30--.

Column 11, line 11, insert --a-- before TCP/IP; and line 12, delete reference numeral "32".

Signed and Sealed this
Second Day of September, 2014

Michelle K. Lee
*Deputy Director of the United States Patent and Trademark Office*

CERTIFICATE OF CORRECTION (continued)
U.S. Pat. No. 7,634,477 B2

Column 14, line 9, replace reference numeral "250" with --215--.

Column 17, line 24, replace reference numeral "374" with --377--.

Column 18, line 58, replace reference numeral "281" with --282--.

Figure 6:
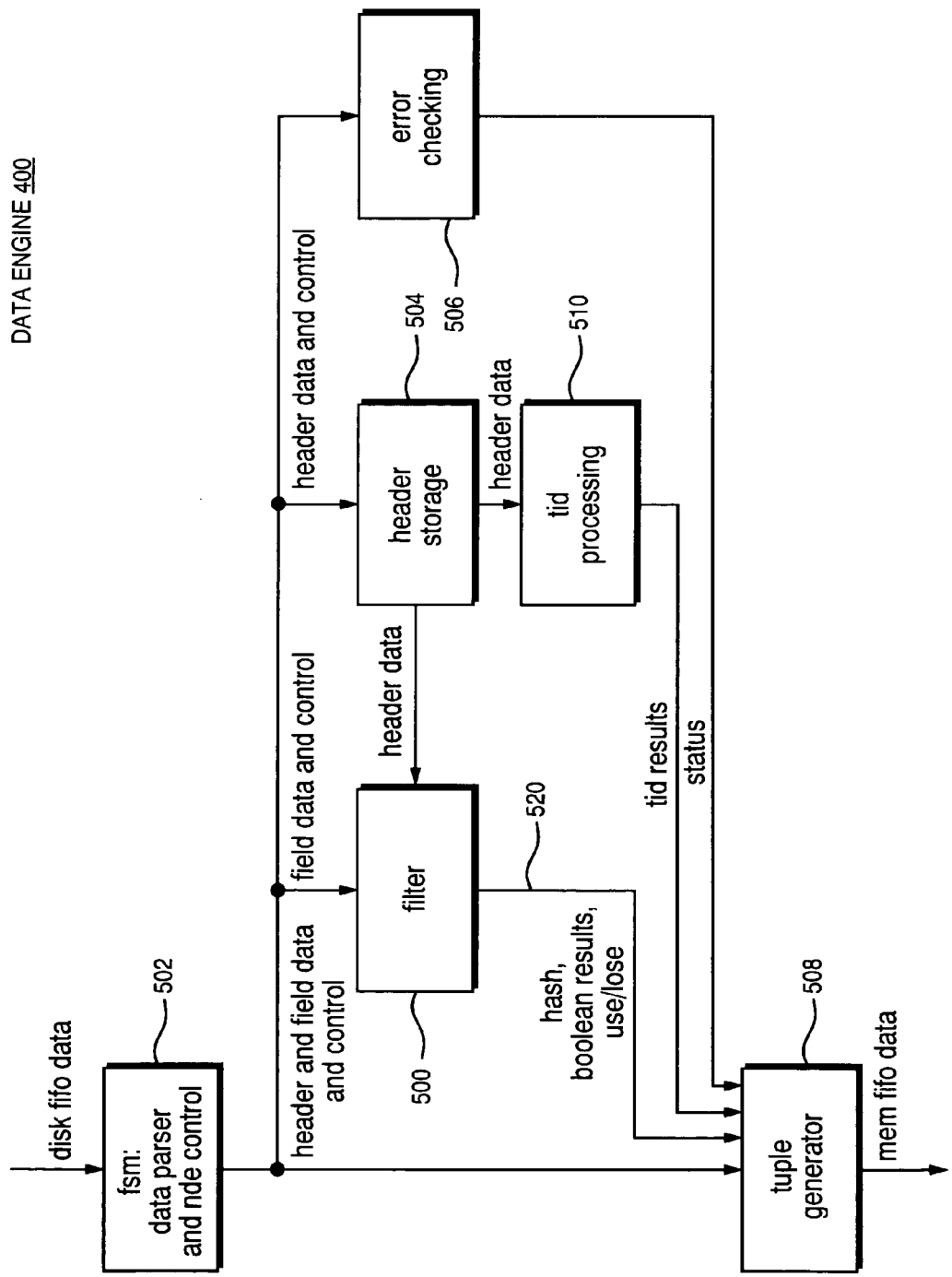
FIG. 6 is a more detailed view of portions of the PSDP.

Column 22, line 27, replace "Fig. 5" with --FIG. 6--; and line 39, replace reference numeral "506" with --502--.

Column 25, line 56, replace reference numeral "30" with --39--.

Column 28, line 51, replace reference numeral "30" with --21/36/39--; line 55, delete reference numeral "252"; and line 60, delete reference numeral "252".

UNITED STATES PATENT AND TRADEMARK OFFICE
CERTIFICATE OF CORRECTION

| | |
|---|---|
| PATENT NO. | : 7,634,477 B2 |
| APPLICATION NO. | : 10/667128 |
| DATED | : December 15, 2009 |
| INVENTOR(S) | : Foster D. Hinshaw |

It is certified that error appears in the above-identified patent and that said Letters Patent is hereby corrected as shown below:

On the title page, in the illustrative figure, at upper left-hand corner, replace "LOCAL APP. 20" with --LOCAL APP. 21--; add reference numeral --20-- at the bottom of the right-hand area for MPP Execution Engine; in LJPU 30 block, replace bottom block "32-1" with --32-p--; in LJPU 30 block, replace "MEM 33" with --MEM 38--; and add reference numeral --34-- to the vertical bus line shown in the right-hand area of the figure.

In the Drawings

Sheet 1, Fig. 1, at upper left-hand corner, replace "LOCAL APP. 20" with --LOCAL APP. 21--; add reference numeral --20-- at the bottom of the right-hand area for MPP Execution Engine; in LJPU 30 block, replace bottom block "32-1" with --32-p--; in LJPU 30 block, replace "MEM 33" with --MEM 38--; and add reference numeral --34-- to the vertical bus line shown in the right-hand area of the figure.

Sheet 3, Fig. 3, replace "Host Disk Manager 250" with --Host Disk Manager 215--; on left-hand side of Fig. 3, add reference numeral --242-- below CUBE BUILDER.

Sheet 4, Fig. 4A, replace reference numeral "300" in upper right-hand corner with --22--; add reference numeral --300-- with a connection to top block COMM in upper left-hand portion of Fig. 4A.

Sheet 5, Fig. 4B, replace reference numeral "350" in upper right-hand corner with --30--; add reference numeral --350-- with a connection to top block COMM in upper left-hand portion of Fig. 4B; and replace "LJPU BOOT/INIT 374" with --LJPU BOOT/INIT377--.

This certificate supersedes the Certificate of Correction issued September 2, 2014.

Signed and Sealed this
Twenty-third Day of September, 2014

Michelle K. Lee
*Deputy Director of the United States Patent and Trademark Office*

CERTIFICATE OF CORRECTION (continued)
U.S. Pat. No. 7,634,477 B2

In the Specification

Column 8, line 39, replace reference numeral "28" with --21--; line 40, replace reference numeral "30" with --39--; and line 54, replace reference numeral "11" with --16--.

Column 10, line 22, replace reference numeral "22" with --30--; and line 44, replace reference numeral "20" with --30--.

Column 11, line 11, insert --a-- before TCP/IP; and line 12, delete reference numeral "32".

Column 14, line 9, replace reference numeral "250" with --215--.

Column 17, line 24, replace reference numeral "374" with --377--.

Column 18, line 58, replace reference numeral "281" with --282--.

Column 22, line 27, replace "Fig. 5" with --FIG. 6--; and line 39, replace reference numeral "506" with --502--.

Column 25, line 56, replace reference numeral "30" with --39--.

Column 28, line 51, replace reference numeral "30" with --21/36/39--; line 55, delete reference numeral "252"; and line 60, delete reference numeral "252".